US010049516B2

(12) United States Patent
Padgett et al.

(10) Patent No.: US 10,049,516 B2
(45) Date of Patent: Aug. 14, 2018

(54) DOOR LOCKS AND ASSEMBLIES FOR USE IN WIRELESS GUEST ENGAGEMENT SYSTEMS

(71) Applicant: Carnival Corporation, Miami, FL (US)

(72) Inventors: John Padgett, Fort Lauderdale, FL (US); Michael G. Jungen, Belle Isle, FL (US); Douglas Steele, Doral, FL (US); Kyle Prestenback, Miami Springs, FL (US); Richard J. Criado, Weston, FL (US); Vince Ball, Kirkland, WA (US); Adam Leonards, Concord, CA (US); Glenn Curtis, Issaquah, WA (US); Manny Vellon, Bellevue, WA (US); Patrick Mendiuk, Kirkland, WA (US); Sander Lam, Bothell, WA (US)

(73) Assignee: CARNIVAL CORPORATION, Miami, FL (US)

( * ) Notice: Subject to any disclaimer, the term of this patent is extended or adjusted under 35 U.S.C. 154(b) by 0 days.

(21) Appl. No.: 15/460,997

(22) Filed: Mar. 16, 2017

(65) Prior Publication Data
US 2018/0137701 A1 May 17, 2018

Related U.S. Application Data

(63) Continuation of application No. 15/459,906, filed on Mar. 15, 2017.
(Continued)

(51) Int. Cl.
H04B 7/00 (2006.01)
G07C 9/00 (2006.01)
(Continued)

(52) U.S. Cl.
CPC ........ *G07C 9/00309* (2013.01); *H04W 4/008* (2013.01); *H04W 4/80* (2018.02); *G07C 2009/00769* (2013.01)

(58) Field of Classification Search
CPC .......................... G07C 9/00309; H04W 4/008
(Continued)

(56) References Cited

U.S. PATENT DOCUMENTS 5,491,471 A 2/1996 Stobbe
5,559,370 A 9/1996 Berney
(Continued)

FOREIGN PATENT DOCUMENTS

CN 105493475 A 4/2016
WO 9618173 A2 6/1996
(Continued)

OTHER PUBLICATIONS

U.S. Non-Final Office Action issued in U.S. Appl. No. 15/460,983, dated May 31, 2017.
(Continued)

Primary Examiner — Md Talukder
(74) Attorney, Agent, or Firm — McDermott Will & Emery LLP

(57) ABSTRACT

A guest engagement system and associated methods provide seamless engagement with guests of facilities through the use of wireless sensing technologies. The system makes use of individual guest devices which are carried by guests and used to automatically identify and authenticate the guests throughout the facility. Services can thereby be seamlessly provided to the guests throughout the facility. The services include automatic unlocking of doors, including hotel or state room doors, based on the guests' immediate proximity to their assigned room's door. The services also include automated payment services provided at checkout or vend-
(Continued)

ing terminals, and automated log-on to interactive displays and portals, among others, based on secure wireless authentication of the guest devices.

22 Claims, 28 Drawing Sheets

Related U.S. Application Data

(60) Provisional application No. 62/420,998, filed on Nov. 11, 2016, provisional application No. 62/440,938, filed on Dec. 30, 2016.

(51) Int. Cl.
*H04W 4/00* (2018.01)
*H04W 4/80* (2018.01)

(58) Field of Classification Search
USPC .................................. 455/41.1, 41.2, 41.3
See application file for complete search history.

(56) References Cited

U.S. PATENT DOCUMENTS

| | | | |
|---|---|---|---|
| 5,742,256 A | 4/1998 | Wakabayashi | |
| 5,806,346 A | 9/1998 | Schlinger et al. | |
| 5,936,544 A | 8/1999 | Gonzales et al. | |
| 6,276,608 B1 | 8/2001 | Cockayne et al. | |
| 6,434,158 B1 | 8/2002 | Harris et al. | |
| 6,629,591 B1 | 10/2003 | Griswold et al. | |
| 7,113,088 B2 | 9/2006 | Frick et al. | |
| 7,170,998 B2 | 1/2007 | McLintock et al. | |
| 7,446,644 B2 | 11/2008 | Schaffzin et al. | |
| 7,696,858 B2 | 4/2010 | Groff | |
| 7,793,847 B2 | 9/2010 | Kakinuma et al. | |
| 7,942,334 B2 | 5/2011 | Charlier et al. | |
| 8,077,044 B2 | 12/2011 | Nikitin et al. | |
| 8,205,370 B2 | 6/2012 | Padgett et al. | |
| 8,216,050 B2 | 7/2012 | Lind et al. | |
| 8,250,796 B2 | 8/2012 | Padgett et al. | |
| 8,250,797 B2 | 8/2012 | Padgett et al. | |
| 8,276,298 B2 | 10/2012 | Padgett et al. | |
| 8,296,983 B2 | 10/2012 | Padgett et al. | |
| 8,371,922 B2 | 2/2013 | Padgett | |
| 8,387,412 B2 | 3/2013 | O'Byrne | |
| 8,416,087 B2 | 4/2013 | Canora et al. | |
| 8,427,278 B2 | 4/2013 | Petricoin, Jr. | |
| 8,469,787 B2 | 6/2013 | Padgett | |
| 8,479,426 B2 | 7/2013 | Padgett et al. | |
| 8,562,424 B2 | 10/2013 | Walker et al. | |
| 8,590,192 B2 | 11/2013 | Padgett et al. | |
| 8,601,731 B2 | 12/2013 | Padgett et al. | |
| 8,608,548 B2 | 12/2013 | Mattice et al. | |
| 8,622,311 B2 | 1/2014 | Hamedani et al. | |
| 8,665,094 B2 | 3/2014 | Lee | |
| 8,787,902 B2 | 7/2014 | Kim | |
| 8,830,188 B2 | 9/2014 | Verthein et al. | |
| 8,847,754 B2 | 9/2014 | Buchheim et al. | |
| 8,922,333 B1 | 12/2014 | Kirkjan | |
| 8,925,825 B2 | 1/2015 | Phillips | |
| 8,991,704 B2 | 3/2015 | Hopper et al. | |
| 9,383,730 B2 | 7/2016 | Prestenback | |
| 9,544,853 B1 | 1/2017 | Gu et al. | |
| 2002/0180582 A1 | 12/2002 | Nielsen | |
| 2002/0191817 A1* | 12/2002 | Sato ................... | G07C 9/00158 |
| | | | 382/118 |
| 2003/0107473 A1* | 6/2003 | Pang ..................... | B60R 25/246 |
| | | | 340/5.72 |
| 2004/0026520 A1 | 2/2004 | Kawai et al. | |
| 2004/0199454 A1 | 10/2004 | Jungen et al. | |
| 2006/0164206 A1 | 7/2006 | Buckingham et al. | |
| 2006/0178110 A1 | 8/2006 | Nurminen et al. | |
| 2006/0214767 A1 | 9/2006 | Carrieri | |
| 2007/0091004 A1 | 4/2007 | Puuri | |
| 2007/0176739 A1 | 8/2007 | Raheman | |
| 2008/0210761 A1 | 9/2008 | Jeon | |
| 2009/0066476 A1 | 3/2009 | Raheman | |
| 2010/0136917 A1* | 6/2010 | Castandet ............... | E05B 81/78 |
| | | | 455/63.1 |
| 2010/0201482 A1* | 8/2010 | Robertson ............ | G07C 9/00111 |
| | | | 340/5.61 |
| 2010/0225429 A1 | 9/2010 | Tsai | |
| 2010/0307206 A1* | 12/2010 | Taylor ................. | G07C 9/00309 |
| | | | 70/91 |
| 2010/0308964 A1 | 12/2010 | Ackley et al. | |
| 2011/0181412 A1 | 7/2011 | Alexander et al. | |
| 2012/0154125 A1 | 6/2012 | Canora et al. | |
| 2012/0234058 A1 | 9/2012 | Neil et al. | |
| 2012/0256724 A1 | 10/2012 | Dayanikli et al. | |
| 2013/0018661 A1 | 1/2013 | Padgett et al. | |
| 2013/0018684 A1 | 1/2013 | Padgett et al. | |
| 2013/0020367 A1 | 1/2013 | Buckley | |
| 2013/0062156 A1 | 3/2013 | Chandaria | |
| 2013/0099893 A1 | 4/2013 | Kulinets et al. | |
| 2013/0113422 A1 | 5/2013 | Lee et al. | |
| 2013/0169815 A1 | 7/2013 | Carney et al. | |
| 2013/0176114 A1 | 7/2013 | Canora et al. | |
| 2013/0221094 A1 | 8/2013 | Smith et al. | |
| 2013/0237193 A1* | 9/2013 | Dumas ................ | G07C 9/00571 |
| | | | 455/414.1 |
| 2013/0241694 A1* | 9/2013 | Sharma ................ | G08C 17/02 |
| | | | 340/5.64 |
| 2013/0315043 A1 | 11/2013 | Jacobi, Jr. | |
| 2013/0331027 A1* | 12/2013 | Rose ..................... | H04W 12/06 |
| | | | 455/41.1 |
| 2014/0002236 A1 | 1/2014 | Pineau et al. | |
| 2014/0049363 A1 | 2/2014 | Ahearn et al. | |
| 2014/0065847 A1 | 3/2014 | Salmon et al. | |
| 2014/0122148 A1 | 5/2014 | Padgett et al. | |
| 2014/0122170 A1 | 5/2014 | Padgett et al. | |
| 2014/0122263 A1 | 5/2014 | Padgett et al. | |
| 2014/0183268 A1 | 7/2014 | Hanshaw | |
| 2014/0219583 A1 | 8/2014 | Bezine et al. | |
| 2014/0222538 A1 | 8/2014 | Merrifield, Jr. et al. | |
| 2014/0225713 A1 | 8/2014 | McIntyre et al. | |
| 2014/0254466 A1 | 9/2014 | Wurster et al. | |
| 2014/0265359 A1 | 9/2014 | Cheng et al. | |
| 2014/0310651 A1 | 10/2014 | Padgett et al. | |
| 2014/0332597 A1 | 11/2014 | Gelinotte et al. | |
| 2014/0340195 A1 | 11/2014 | Polak et al. | |
| 2014/0340196 A1 | 11/2014 | Myers et al. | |
| 2014/0354494 A1 | 12/2014 | Katz | |
| 2014/0375421 A1 | 12/2014 | Morrison et al. | |
| 2015/0015504 A1 | 1/2015 | Lee et al. | |
| 2015/0157537 A1 | 6/2015 | Lanigan et al. | |
| 2015/0229019 A1 | 8/2015 | Osterhout et al. | |
| 2015/0304478 A1 | 10/2015 | Kim et al. | |
| 2016/0018849 A1 | 1/2016 | Tilney | |
| 2016/0049025 A1* | 2/2016 | Johnson ............... | G07C 9/00007 |
| | | | 340/5.61 |
| 2016/0055692 A1 | 2/2016 | Trani | |
| 2016/0056526 A1 | 2/2016 | Li et al. | |
| 2016/0058375 A1 | 3/2016 | Rothkopf | |
| 2016/0066123 A1 | 3/2016 | Ko et al. | |
| 2016/0073264 A1 | 3/2016 | Van den Broeck et al. | |
| 2016/0077495 A1 | 3/2016 | Brown et al. | |
| 2016/0087982 A1 | 3/2016 | Takano et al. | |
| 2016/0094072 A1 | 3/2016 | Chen et al. | |
| 2016/0103590 A1 | 4/2016 | Vu et al. | |
| 2016/0112878 A1 | 4/2016 | Kaushik | |
| 2016/0117458 A1 | 4/2016 | Hermans et al. | |
| 2016/0165570 A1 | 6/2016 | Kim et al. | |
| 2016/0198782 A1 | 7/2016 | Thompson | |
| 2016/0205229 A1 | 7/2016 | Vincent | |
| 2016/0232728 A1 | 8/2016 | Allibhoy et al. | |
| 2016/0254587 A1 | 9/2016 | Jung et al. | |
| 2016/0277560 A1 | 9/2016 | Gruberman et al. | |
| 2016/0283759 A1 | 9/2016 | Forster | |
| 2016/0343189 A1* | 11/2016 | Dumas ................ | G07C 9/00309 |
| 2016/0366858 A1 | 12/2016 | Seltzer et al. | |
| 2016/0371910 A1* | 12/2016 | Baumgarte ......... | G07C 9/00817 |
| 2017/0019765 A1 | 1/2017 | Hoyer et al. | |
| 2017/0041886 A1 | 2/2017 | Baker et al. | |

(56) References Cited

U.S. PATENT DOCUMENTS

| | | | |
|---|---|---|---|
| 2017/0048495 A1* | 2/2017 | Scalisi | H04L 12/2818 |
| 2017/0079759 A1 | 3/2017 | Dunlop | |
| 2017/0083049 A1 | 3/2017 | Kim et al. | |
| 2017/0127222 A1 | 5/2017 | Lang et al. | |
| 2017/0180930 A1 | 6/2017 | Mycek et al. | |
| 2017/0186254 A1* | 6/2017 | Dumas | G07C 9/00111 |
| 2017/0187658 A1 | 6/2017 | Ryu et al. | |
| 2017/0205783 A1* | 7/2017 | Tannenbaum | G05B 15/02 |
| 2017/0205879 A1 | 7/2017 | Joseph et al. | |
| 2017/0237458 A1 | 8/2017 | VanDuyn et al. | |
| 2017/0263086 A1* | 9/2017 | Matsuura | G08B 7/06 |

FOREIGN PATENT DOCUMENTS

| | | |
|---|---|---|
| WO | 2014136338 A1 | 9/2014 |
| WO | 2014139331 A1 | 9/2014 |

OTHER PUBLICATIONS

U.S. Non-Final Office Action issued in U.S. Appl. No. 15/460,972, dated Aug. 10, 2017.

Non-Final Office Action issued in U.S. Appl. No. 15/459,906 dated May 25, 2017.

Anonymous, "Bluetooth Low Energy Beacon," retrieved from the Internet on Jul. 5, 2017: URL:https://en.wikipedia.org/w/index.php?title=Bluetooth low energy beacon&oldid=747 829744, Nov. 4, 2016.

Invitation to Pay Additional Fees and, Where Applicable, Protest Fee with Communication Relating to the Results of the Partial International Search, issued in International Application No. PCT/US2017/033120, dated Jul. 19, 2017.

Office Action issued in U.S. Appl. No. 15/655,768 dated Oct. 19, 2017.

Office Action issued in U.S. Appl. No. 15/655,722 dated Oct. 25, 2017.

Office Action issued in U.S. Appl. No. 15/459,906 dated Oct. 20, 2017.

Final Office Action issued in U.S. Appl. No. 15/460,983, dated Sep. 5, 2017.

"Bluetooth security token", <http://www.alibaba.com/product-detail/bluetooth-security-token_1714163047.html>. retrieved Mar. 14, 2017.

"Orbita Zinc Alloy Electronic RFID Card Hotel Door Lock Hotel RF Lock E3041", <https://www.alibaba.com/product-detail/Orbita-Zinc-alloy-Electronic-RFID-card_60335342947.html>. retrieved Mar. 15, 2017.

"Electronic Hotel Card Lock (E4031)", <http://orbitalock.en.made-in-china.com/product/gMVEFhColDkc/China-Hotel-RF-Card-Lock-E3031-.html>. retrieved Mar. 14, 2017.

N. Lomas, "Genie Smart Lock Aims for Year-Long Battery Life" Tech Crunch, Jul. 22, 2014 <http://techcrunch.com/2014/07/22/genie-smart-lock/>. retrieved Mar. 14, 2017.

"Bluetooth BLE Lock Specific Functions Can Be Customized" <http://www.alibaba.com/product-detail/Bluetooth-ble-lock_60109441902.html>. retrieved Mar. 14, 2017.

"Wholesale Abibaba Home Card Reader NFC Door Lock (HF-LM9)", <http://www.alibaba.com/product-detail/Wholesale-Abibaba-Home-Card-Reader-NFC_1967536680.html>. retrieved May 17, 2015.

"Hotel LED Display Mifare 1 Card Lock", <http://www.ecvv.com/product/2490752.html>. retrieved Mar. 14, 2017.

"Genie Smart Lock", <http://www.geniesmartlock.coml>. retrieved Feb. 14, 2015.

<http://www.gojiaccess.com/>. retrieved Feb. 15, 2015.

M. Rittenbruch, (2013) "CubIT: Large-scale multi-user presentation and collaboration". In Proceedings of the 2013 ACM International Conference on Interactive Tabletops and Surfaces (ITS'13), ACM, St Andrews, UK. <http://eprints.qut.edu.au/61903/1/cubit-poster-abstract-final-mq.pdf>.

"Collection Wall" MW2014: Museums and the Web 2014, The annual conference of Museums and the Web, Apr. 2-5, 2015, Baltimore, MD, <http://mw2014.museumsandtheweb.com/bow/collection-wall>. retrieved Mar. 14, 2017.

"College Football Hall of Fame" Obsura, <http://obscuradigital.com/work/college-football-hall-fame/>, retrieved Mar. 14, 2017.

M. Rittenbruch, "Supporting Collaboration in Large-scale Multi-user Workspaces", Institute for Future Envirments, Queensland University of Technology Brisbane, QLD 4001, Australia, <http://tecton3d.ist.utl.pt/CmIS/papers/CmIS_paper20.pdf>.

"Art Museum Creates Interactive Visitor Experience With Christie MicroTiles Video Walls", Digital Signage Connection, < http://www.digitalsignageconnection.com/art-museum-creates-interactive-visitor-experience-christie-microtiles-video-walls-959>. retrieved May 12, 2015.

"Interactive Walls", Sensory Interactive, <http://www.sensoryinteractive.net/projects/view/wisconsin_institute_for_discovery>. retrieved Mar. 14, 2017.

S, Hsi et al., "RFID Enhances Visitors' Museum Experience at the Exploratorium", Communications of the ACM, Sep. 2005, vol. 48, No. 9. pp. 60-65.

Non-Final Office Action issued in U.S. Appl. No. 15/460,983, dated Jan. 24, 2018.

Non-Final Office Action issued in U.S. Appl. No. 15/460,972, dated Jan. 16, 2018.

Notice of Allowance issued in U.S. Appl. No. 15/165,768, dated Mar. 5, 2018.

Notice of Allowance issued in U.S. Appl. No. 15/459,906, dated Mar. 21, 2018.

International Search Report and Written Opinion issued in International Application No. PCT/US2017/033120, dated Nov. 10, 2017.

Final Office Action issued in U.S. Appl. No. 15/655,722, dated Apr. 13, 2018.

* cited by examiner

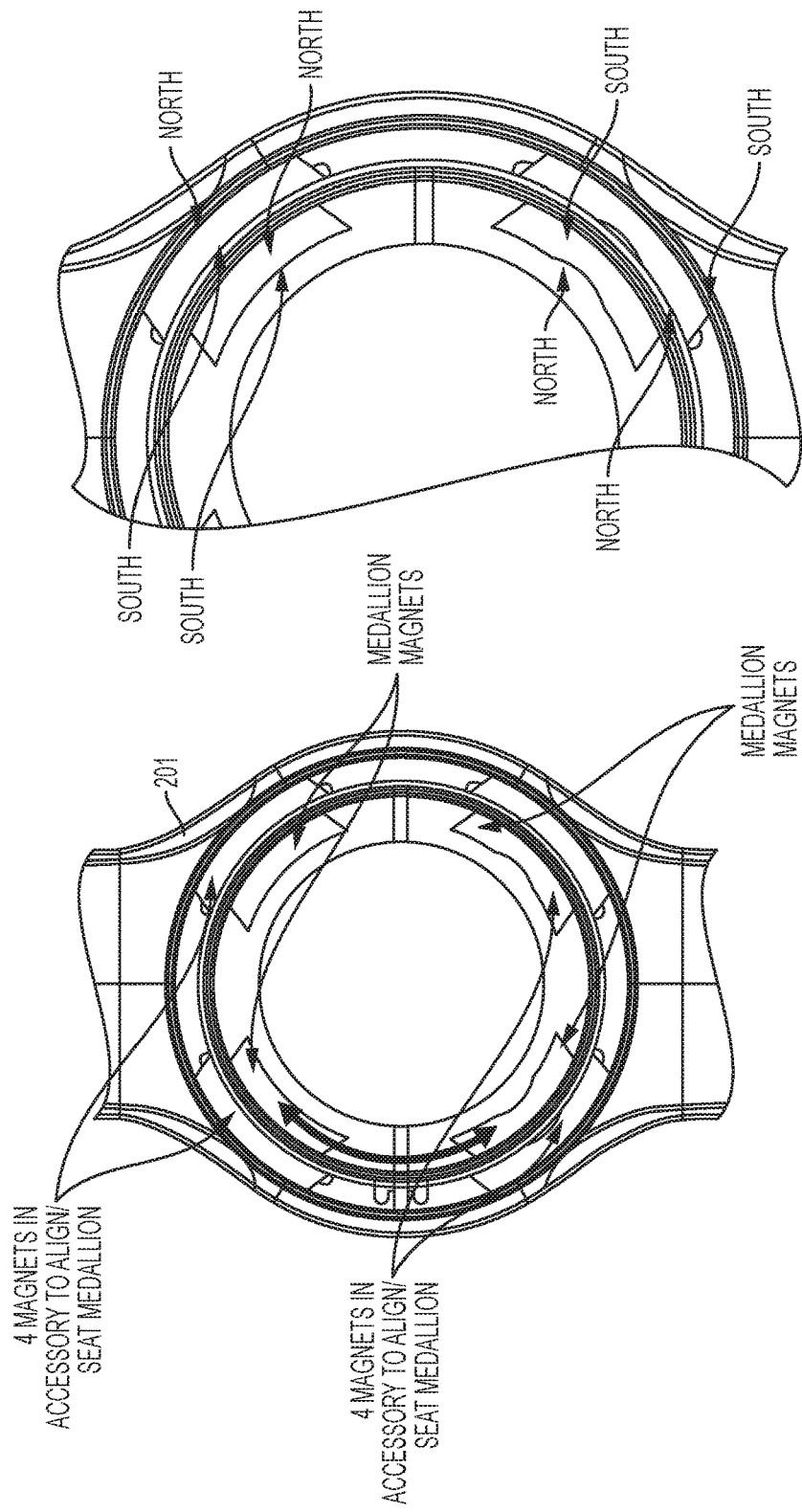

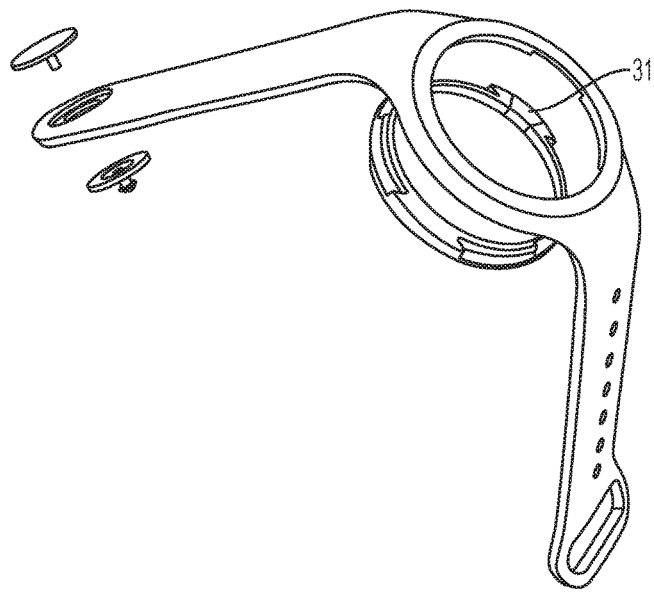
FIG. 4A
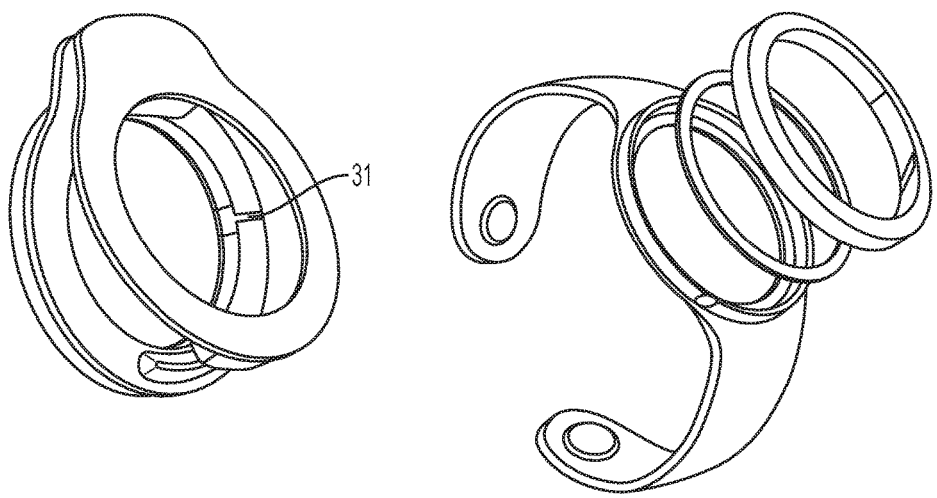
FIG. 4B
FIG. 4C

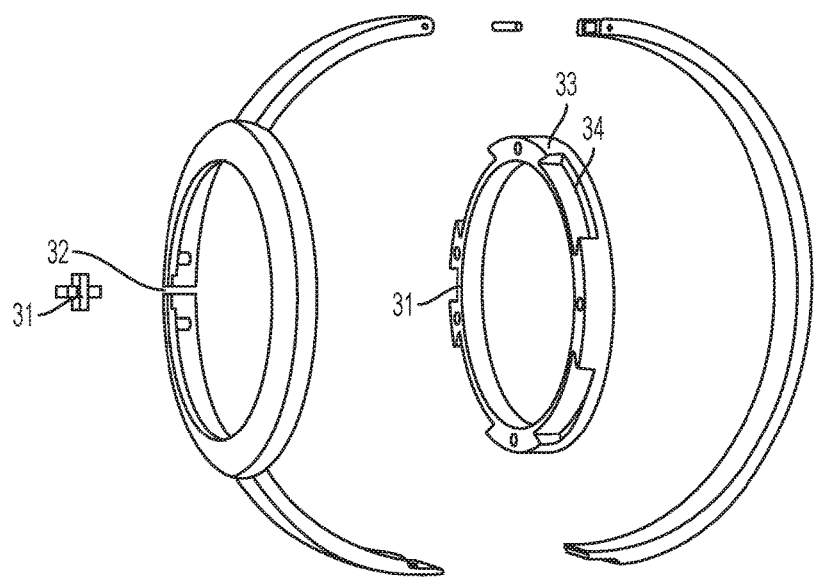
FIG. 4D
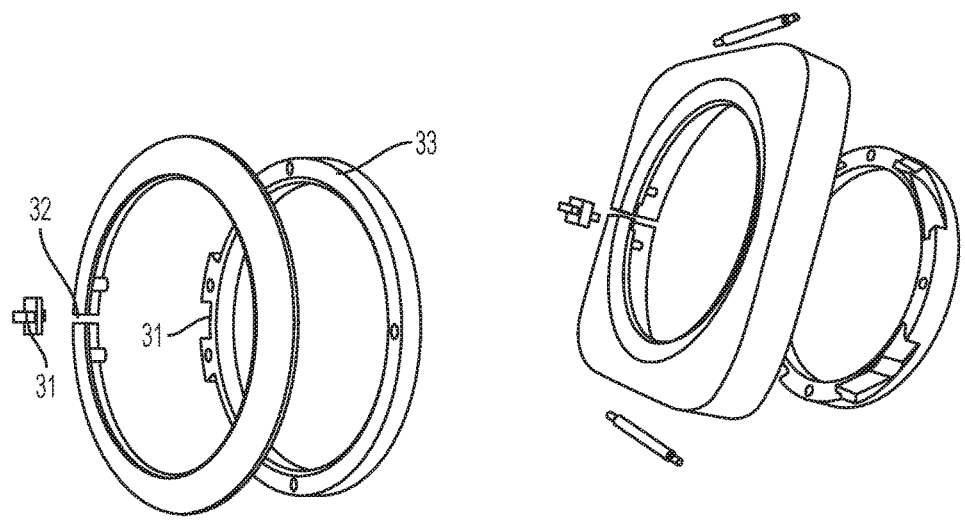
FIG. 4E
FIG. 4F

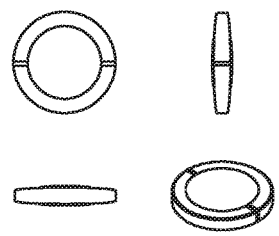
FIG. 5A
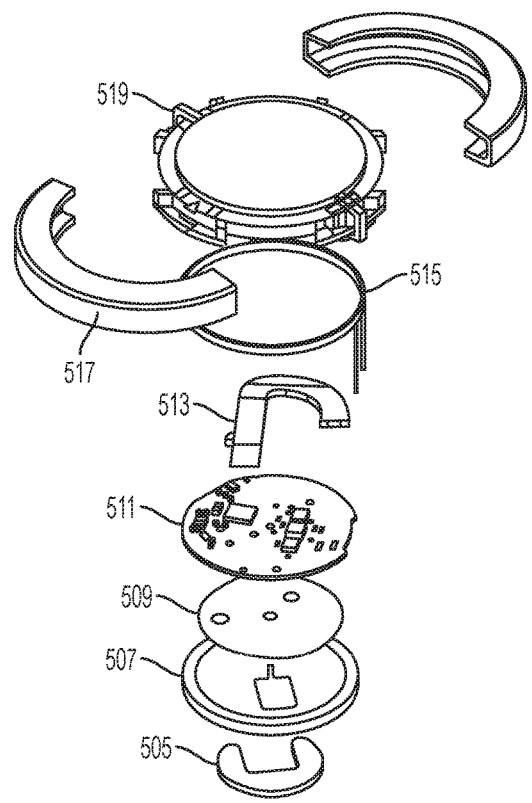
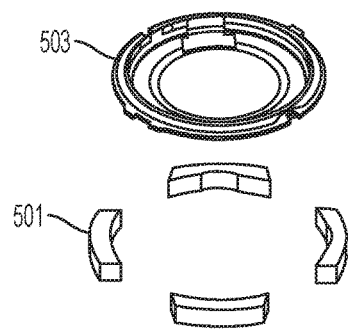
FIG. 5B

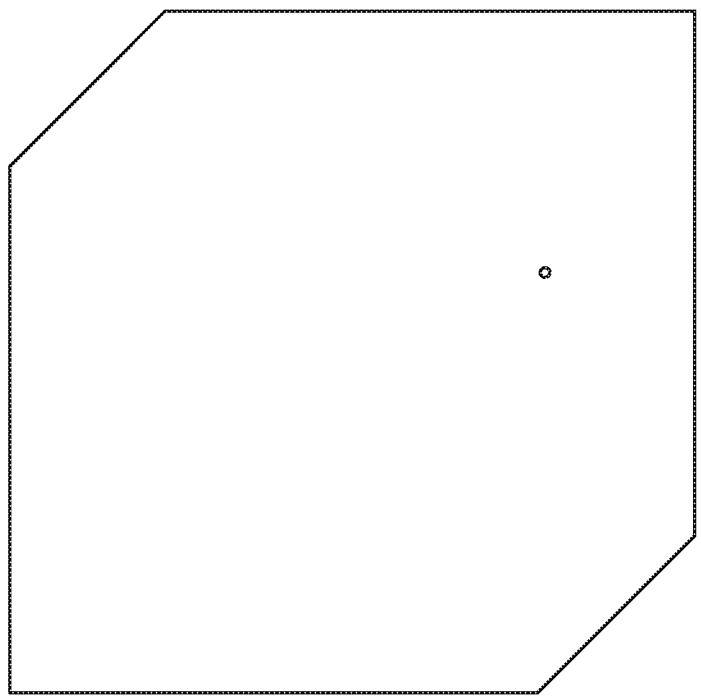

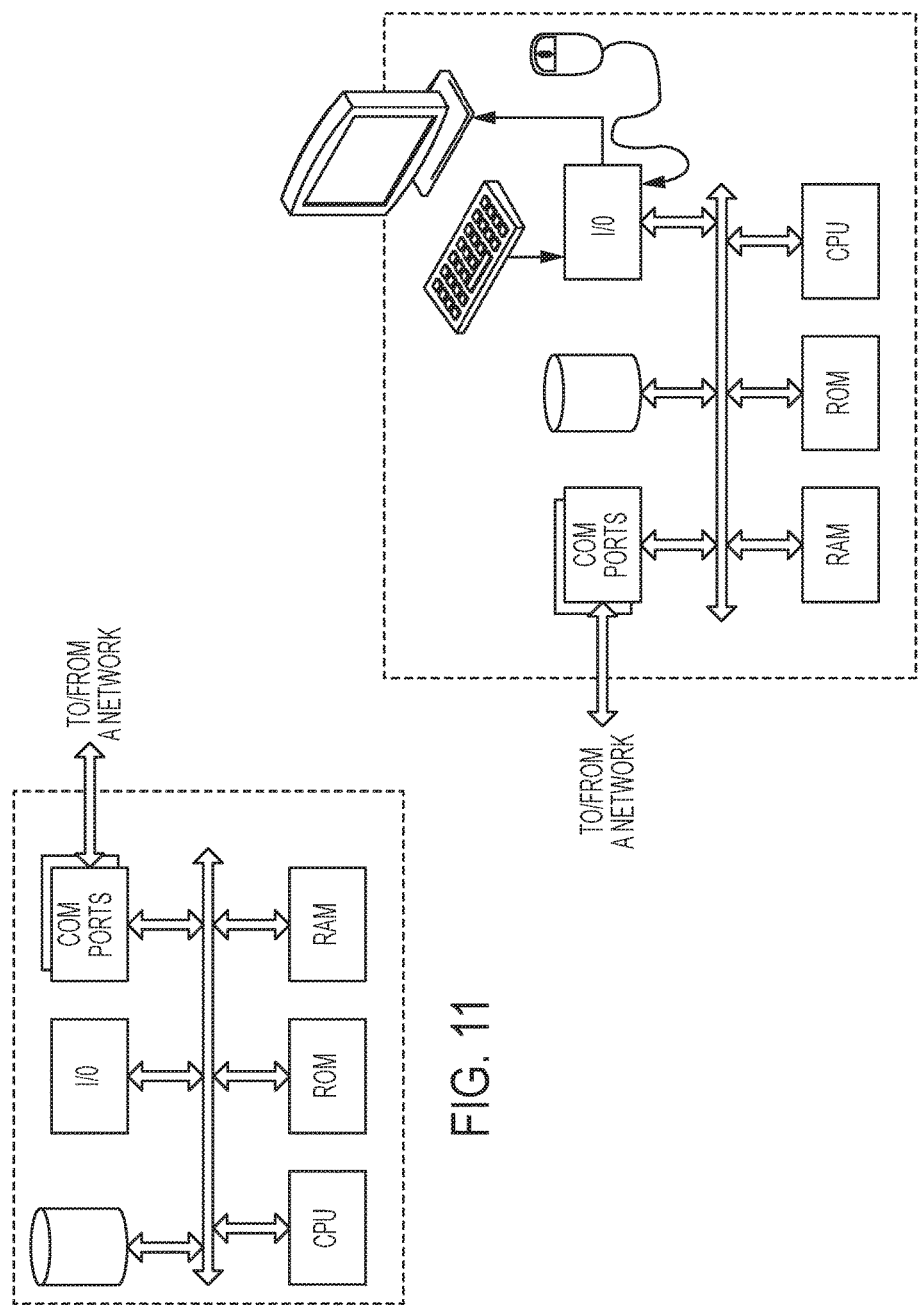

DOOR LOCKS AND ASSEMBLIES FOR USE IN WIRELESS GUEST ENGAGEMENT SYSTEMS

CROSS-REFERENCE TO RELATED APPLICATIONS

This application is a continuation of U.S. application Ser. No. 15/459,906 filed Mar. 15, 2017, which in turn claims the benefit of U.S. Provisional Applications No. 62/420,998, filed on Nov. 11, 2016, and No. 62/440,938, filed on Dec. 30, 2016 in the U.S. Patent and Trademark Office, the disclosures of which are incorporated by reference herein in their entireties.

TECHNICAL FIELD

The present subject matter relates to techniques and equipment for providing automated engagement with guests of a facility using wireless sensing technologies.

BACKGROUND

Guests of hotels and resorts, cruise ships, as well as other retail and commercial establishments, have come to expect a high level of service and engagement from their hosts. The service can include being provided with ready access to private and/or restricted areas without having to present a badge or other form of identification, to swipe or tap an access card, or to otherwise proactively authenticate themselves. The engagement can include being personally recognized by the hosts and provided with services and recommendations on that basis, without requiring the guests to identify themselves and remind the host of their preferences or pre-existing bookings.

In the present context, service and engagement is provided only on the basis of users providing a name or identification, tapping or swiping an access card, and having information on bookings retrieved manually by a host through a computer terminal. For example, guests must present photo identification and a credit card at the time of check-in, guest must tap or swipe an access card to activate elevators or unlock doors of health facilities and guest rooms during their stay, and guests must identify themselves each time they interact with a concierge, restaurant host, or front desk staff. As a result, interactions between hosts and guests are impersonal and disjoined.

This disclosure provides a novel guest engagement system that relies on recent improvements in low power wireless communication technologies and distributed sensor networks to provide novel services to those guests without requiring guests to proactively identify and/or authenticate themselves. The guest engagement system thereby enables hosts to seamlessly engage with the guests throughout their facilities and provide recommendations to the guests based on the guests previous experiences.

SUMMARY

The teachings herein provide system and methods for providing seamless engagement with guests of facilities including (and not limited to) resorts, cruise ships, hotels, convention centers, retail and other commercial establishments, amusement parks, casinos, or other large-scale facility (or group of facilities), through the use of wireless sensing technologies. The functionalities rely on guests having individual guest devices which are used to automatically identify and authenticate the guests throughout the facility, so as to seamlessly provide services to the guests.

The guest engagement system relies on the guest devices (also referenced as medallions) periodically broadcasting beacon signals that uniquely identify the devices and their associated guests. The periodic beacon signals are detected by sensors provided throughout the facility, and used by the guest engagement system to provide personalized services. The services include automatic unlocking of doors, including hotel or state room doors, based on the guests' immediate proximity to their assigned room's door. The services also include automated payment services provided at checkout or vending terminals, and automated log-on to interactive displays and portals, among others, based on secure wireless authentication of the guest devices.

In accordance with one aspect of the present disclosure, a guest engagement system includes a plurality of guest devices provided to users of the guest engagement system, each guest device including a wireless communication antenna and operative to emit a periodic beacon signal broadcasting a unique identifier of the guest device using Bluetooth low energy (BLE) communications. The guest engagement system further includes a sensor network comprising a plurality of sensors each mounted at a different known location and operative to detect the periodic beacon signals including the unique identifiers emitted using BLE communications by guest devices of the plurality of guest devices that are proximate to the sensor. The guest engagement system additionally includes a communication network connecting each of the plurality of sensors of the sensor network, and a central server. The central server is communicatively connected to each of the plurality of sensors of the sensor network via the communication network, and stores a log associating each unique identifier of a guest device detected using BLE communications by a sensor of the sensor network with the known location of the sensor and a timestamp.

In accordance with another aspect of the present disclosure, a guest engagement system includes a plurality of guest devices provided to users of the guest engagement system, each guest device having a unique identifier and including first and second wireless communication antennas respectively configured for Bluetooth low energy (BLE) and near field communication (NFC) communications. The guest engagement system further includes a sensor network comprising a plurality of sensors each mounted at a different location. At least one sensor of the plurality of sensors is operative to detect guest devices that are proximate thereto and receive unique identifiers therefrom based on BLE communication with the guest devices, and at least another sensor of the plurality of sensors is operative to detect guest devices that are proximate thereto and receive unique identifiers therefrom based on NFC communication with the guest devices. The guest engagement system also includes a communication network connecting each of the plurality of sensors of the sensor network, and a central server. The central server is communicatively connected to each of the plurality of sensors of the sensor network via the communication network, and stores a log associating each unique identifier of a guest device received using BLE or NFC communications by a sensor of the sensor network.

In accordance with one aspect of the present disclosure, an assembly includes a wireless device and an accessory. The wireless device has a device body with a tapered shape including a front surface, a rear surface having a same shape as the front surface and a greater dimension than the front surface, and a cavity in which a processor and at least one wireless communication antenna are disposed. The accessory is configured to be worn by a user and has an accessory body having a tapered cavity configured to releasably receive the wireless device. The tapered cavity includes a rear opening having the same shape as the front and rear surfaces of the device body.

In accordance with another aspect of the present disclosure, a wireless device includes a body having a tapered shape including a front surface and a rear surface having a same shape as the front surface and a dimension greater than the front surface. The body includes a cavity in which a processor and at least one wireless communication antenna are disposed.

In accordance with a further aspect of the present disclosure, an accessory configured to be worn by a user includes a body having inner and outer surfaces respectively configured to face towards and away from the user when the accessory is worn. The body has a tapered cavity extending between a front opening in the outer surface of the body and a rear opening in the inner surface of the body, the rear opening has a same shape as the front opening, and the rear opening has a dimension that is greater than that of the front opening.

In accordance with another aspect of the present disclosure, a portable wireless device includes a body having a fully enclosed cavity, the body having all dimensions equal to or smaller than 2.5 inches, and the body having a thickness equal to or smaller than ⅝ inch. The portable wireless device further includes a processor, a memory, a battery, and first and second wireless communication antennas disposed in the cavity. The first and second wireless communication antennas are respectively configured for Bluetooth low energy (BLE) and near field communication (NFC) communications.

In accordance with another aspect of the present disclosure, a portable wireless device includes a body having a fully enclosed cavity, and a processor, a memory, a battery, and first and second wireless communication antennas disposed in the cavity. The first and second wireless communication antennas are respectively configured for Bluetooth low energy (BLE) and near field communication (NFC) communications. The body comprises an open metallic ring disposed to substantially surround the cavity of the body, and the open metallic ring includes at least one opening having a non-conducting material disposed therein.

In accordance with another aspect of the present disclosure, a portable wireless device includes a body having a fully enclosed cavity, and a processor, a memory, a battery, and first and second wireless communication antennas disposed in the cavity. The body has a frustum shape, a front surface that is circular, and a rear surface that is circular and has a diameter greater than that of the front surface. The front and rear surfaces have diameters of 0.75 to 2.5 inches, the body has a thickness of ⅛ to ⅝ inch, and an angle between the front surface and a side surface of the frustum-shaped body is in the range of 86 to 88 degrees. The first and second wireless communication antennas are respectively configured for Bluetooth low energy (BLE) and near field communication (NFC) communications.

In accordance with another aspect of the present disclosure, an electronic door lock assembly includes a latch assembly, a door lock communication module, and an access panel. The latch assembly includes a latch and an electronically controlled locking mechanism operative to selectively unlock a door. The door lock communication module is electrically connected to the electronically controlled locking mechanism of the latch assembly, and includes a radio configured for wireless communication. The access panel includes a radio configured for wireless communication with the door lock communication module, a first transceiver configured for wireless communication with a user device, and a second transceiver for communication with a reservation server.

In accordance with another aspect of the present disclosure, a door latch assembly includes a door knob, a latch selectively operated by operation of the door knob, an electronically controlled locking mechanism operative to selectively unlock the latch, and a proximity sensor operative to sense contact or proximity of a user with the door knob. The electronically controlled locking mechanism is operative to selectively unlock the latch based on the contact or proximity of the user with the door knob sensed by the proximity sensor.

In accordance with another aspect of the present disclosure, an access panel for controlling an electronically controlled door lock includes a radio and first and second transceivers. The radio is configured for wireless communication with a door lock communication module electrically connected to an electronically controlled locking mechanism. The first transceiver is configured for wireless communication with a user device to identify a user seeking to activate the electronically controlled locking mechanism. The second transceiver is configured for communication with a reservation server storing identifiers of users authorized to activate the electronically controlled locking mechanism. Each of the radio, first transceiver, and second transceiver operate according to a different communication standard.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 2A-2E and 3A-3E show medallions or guest devices used in the guest engagement system and accessories within which the medallions can be releasably inserted.

FIGS. 4A-4F show exploded perspective views of further accessories within which the medallions can be releasably inserted.

FIGS. 5A-5L are diagrams showing component parts of the medallions or guest devices.

FIGS. 7A-7I show an automated door lock assembly and components thereof that provides for automatically unlocking a door based on an interaction with a medallion.

FIGS. 11 and 12 are simplified functional block diagrams of computer hardware platforms that may be used to implement functionalities of the guest engagement system.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various techniques and equipment systems disclosed herein enable automated engagement with users or guests of a facility using wireless sensing technologies.

The guest engagement system relies on wireless sensing technologies to securely identify guests based on medallions worn or carried by the guests, and to automatically provide services to the guests based on the secure identification. The system additionally provides enhanced engagement with guests by maintaining a database of guest locations and experiences, and enabling services to be provided to the guest seamlessly regardless of the guests' locations.

Figure 1A:
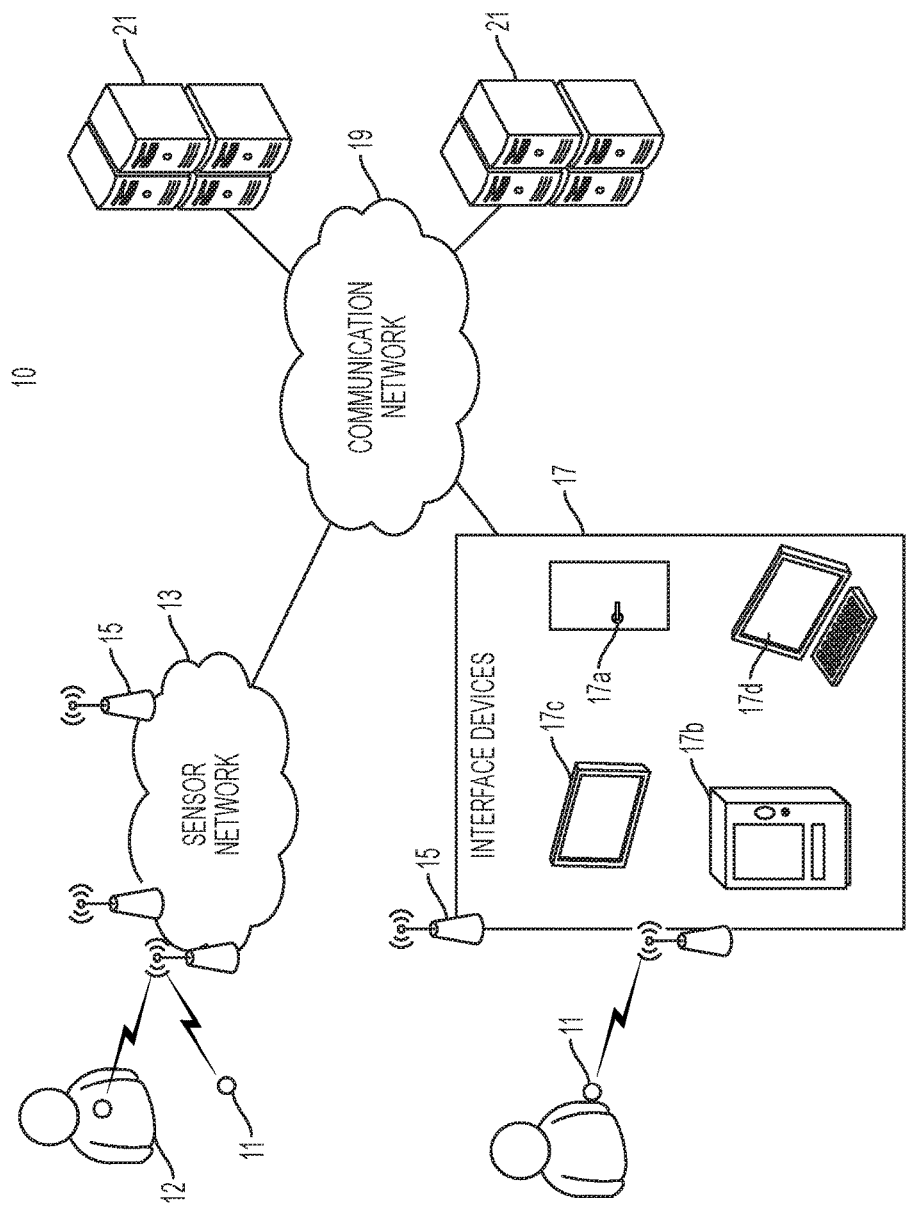
FIGS. 1A and 1B are high-level functional block diagrams showing components of a guest engagement system.

FIG. 1A provides a general block diagram showing components of a guest engagement system 10. The guest engagement system 10 of FIG. 1A may be provided in a facility such as a ship (e.g., cruise ship), hotel, restaurant, resort, convention center, medical center or other treatment facility, retail or other commercial establishment, entertainment venue (e.g., concert hall, movie theater, arena, or stadium, amusement park or casino), transportation center (e.g., airport, marine port or terminal, train or bus station, multimodal transport center), or other facility or combination of such facilities. In one example, the facility may be a cruise ship hosting large numbers of guests, or a cruise ship line including multiple cruise ships, associated shore facilities (e.g., port facilities), and partnering facilities (e.g., facilities of partners providing shore activities for cruise guests). In another example, the facility may be a resort including one or more hotels, restaurants, theaters, amusement parks, and other associated facilities distributed across one or more geographic locations. In a further example, the facility may be a set of facilities associated with a particular event, such as a convention or tradeshow, that includes locations of multiple partnering establishments (e.g., hotels, restaurants, museums, arenas, malls or other retail locations). Users of the guest engagement system are referenced generally herein as guests 12. In the example of a cruise ship, the guests 12 include cruise passengers and can more generally include stewards, staff, and other users of guest devices 11. In other examples, guests 12 can include any person interacting with the guest engagement system 10 including users of guest devices 11. Guests 12 may thus reference patients, nurses, doctors, and visitors, among other users, in the illustrative context of a medical or treatment facility; convention goers and/or exhibitors in the illustrative context of a convention facility; shoppers, staff members, travelers, sales personnel, and others in illustrative contexts of various types of commercial establishments.

The guest engagement system 10 is configured to communicate wirelessly with guest devices 11, such as medallions worn or carried by guests 12, which each uniquely identify an associated guest and are configured for secure communication with the guest engagement system 10. In the examples detailed herein, the guest devices 11 take the form of medallions and will generically be referenced as medallions in this disclosure. However, the devices/medallions 11 can take other formats, and the term medallion thus is not intended to limit the scope of guest devices 11 that may be used as part of the system 10. The guest devices/medallions 11 are preferably light and compact so as to be readily worn or carried by users. The guest devices/medallions 11 are configured to communicate using at least one wireless communication technology/protocol and, preferably, are configured to communicate using two or more distinct wireless communication technologies/protocols. For example, a medallion 11 can be configured to communicate according to both near field communication (NFC) standards and Bluetooth low energy (BLE) standards, though the medallion 11 may generally operate using only one of the standards at any given time in order to reduce energy expenditure.

The guest engagement system 10 includes a sensor network 13 of sensors 15 mounted throughout the facility and configured to communicate wirelessly with guests' medallions 11. A sensor 15 of the network 13 may be used for sensing a guest's location (or proximity to the sensor 15), for example by detecting beacon signals or other signals emitted by the medallion 11. The sensor 15 can also engage in two-way communication with the medallion 11 to transmit information to and receive information from the medallion 11. A sensor 15 may also be located in or otherwise associated with a particular interface device 17 or interface function of the system, such as a sensor that is associated with a door lock 17a, an automatic door or turnstile, a vending terminal 17b, a cash register, a slot machine, an interactive display 17c or portal 17d, or the like. In some situations, the sensor 15 is mounted within the interface device 17, while in other situations, a sensor 15 associated with an interface device 17 is mounted in the vicinity of the interface device. For example, a spotlight sensor can be placed above a location at which a user interacting with the interface device 17 would be located (e.g., above a location directly in front of, and around 1 foot away from, the interface device 17), so as to only sense beacon signals emitted by medallions of users located directly in front of and close to the interface device 17. When associated with a particular interface device 17 or interface function, the sensor 15 may engage in two-way communication with the medallion 11 and provide a secure communication channel between the device and medallion, for example to provide automatic unlocking of the door lock based on secure authentication of a particular guest's medallion.

The guest engagement system 10 can further make use of end devices such as BLE-enabled mobile devices, tablet computers, or interactive displays to provide services to guests through sensing of (and communication with) medallions 11. The services provided using end devices can be provided in addition to the aforementioned services provided using the sensors 15 of the sensor network 13 and of interface devices 17 to provide services. As described in further detail below (see, e.g., the discussion of FIG. 9), the services provided through the end devices can include location services (including location-sensing of medallions based on the end devices sensing medallions' beacon signals, and reporting of sensed medallions and locations to a system server 21), and causing medallions to switch into or out of a various operating modes (e.g., sleep, beacon, and bi-directional modes), among other services.

The guest engagement system 10 also includes one or more servers 21 communicatively connected to the network 13 of sensors, to the interface devices 17, and wirelessly to the medallions 11 via the various sensors 15 provided throughout the guest engagement system 10 and the associated facility. One or more communications network(s) 19 provide communication capabilities between the various elements of the system 10. In one example, the guest engagement system 10 includes at least one authentication server used to authenticate guests' medallions and provide encryption and decryption services. The system can further include one or more servers storing databases of guest information (e.g., guest reservations), payment transaction servers (e.g., including guest billing information), location information (e.g., locations of sensors 15 within the facility, and locations of medallions 11 throughout the facility and elsewhere) and the like.

Detailed descriptions of various components of the guest engagement system 10 will now be provided with reference to the accompanying figures. The descriptions are focused on illustrative embodiments of components of the system, and do not limit the scope of attributes and functions of the components and system.

Two different structures of sensors 15 can be used in the system. In one example, each individual sensor 15 in the guest engagement system 10 includes a processor and memory that control, at least in part, operation of the sensor 15. In such an example, each sensor may additionally include a network transceiver including a communication port for communicatively connecting the sensor 15 to the communication network 19. The network transceiver may be an Ethernet, Wifi, or other appropriate transceiver.

Figure 1B:
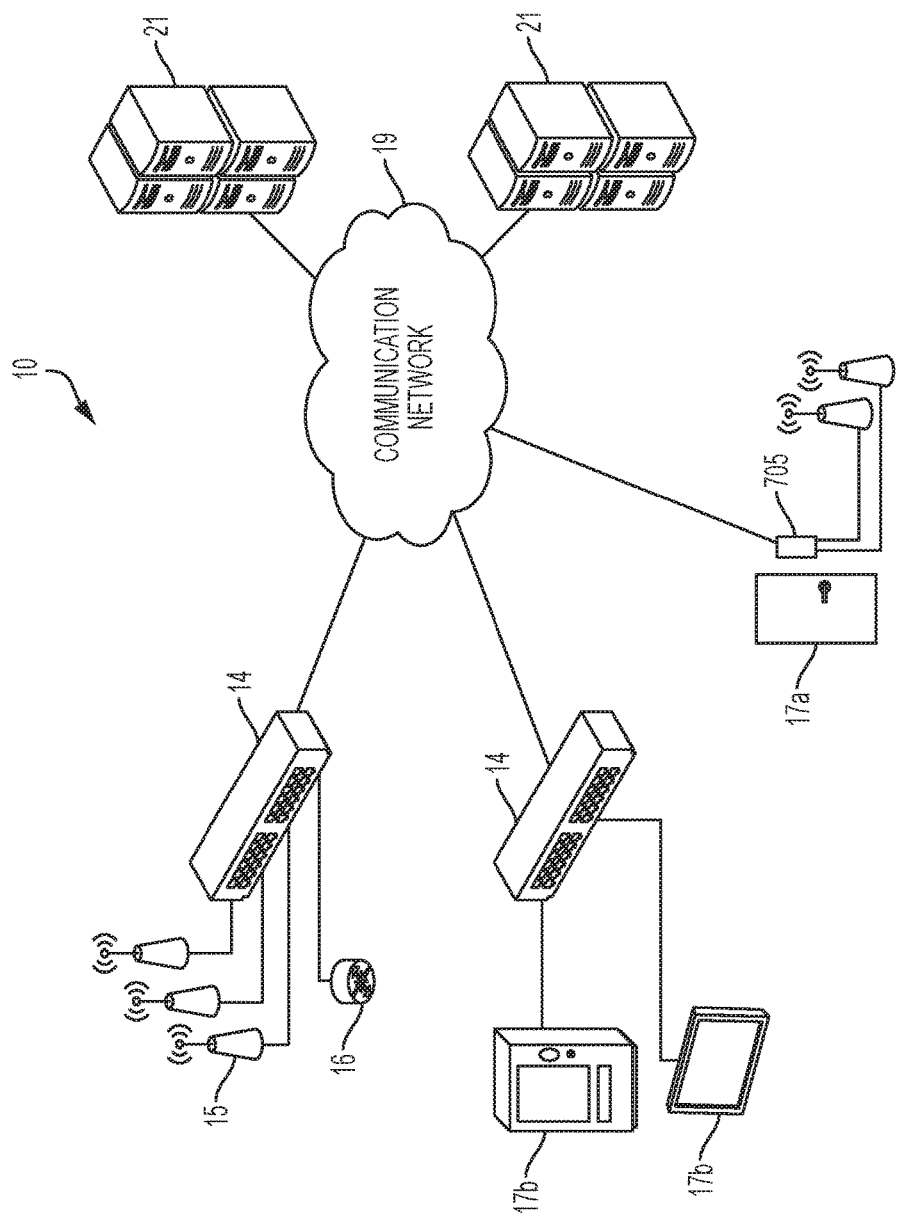

Alternatively or additionally, the guest engagement system 10 may include sensor network peripherals 14 distributed throughout the facility and operative to have sensors 15 directly connected thereto. In such an example, FIG. 1B provides a general block diagram showing a more detailed view of the sensor network 13 of the guest engagement system 10 showing sensor network peripherals 14 that are used to connect sensors 15 to the communication network 19. In particular, as shown in the figure, sensors 15 of the sensor network 13 are each directly connected to respective sensor network peripherals 14, and each receive power from and operate under the control of the corresponding sensor network peripheral 14. In turn, the sensor network peripherals 14 are connected to the communication network 19 and communicate with the servers 21 through the network 19.

Each sensor network peripheral generally includes a network transceiver for communication with the communication network 19, such as an Ethernet, Wifi, or other appropriate network transceiver. Each sensor network peripheral 14 further includes at least one port for connecting at least one associated sensor 15. For example, the sensor network peripheral 14 typically includes one or more communication buses through which multiple sensors 15 or other devices can be connected. For instance, a sensor network peripheral 14 may include two buses each operative to connect up to sixteen sensors 15 in one example. Through these connections, the sensor network peripherals 14 serve to relay sensing information captured by the sensors 15 to the communication network 19 and servers 21, and to relay control or communications from the communication network 19 and servers 21 back to the sensors 15. The sensor network peripherals 14 may further relay data or other communications received from medallions 11 by the sensors 15 to the communication network 19 and servers 21, and to relay control or communications from the communication network 19 and servers 21 back to the medallions 11 via the sensors 15.

Each sensor network peripherals 14 includes a processor and memory, and is operative to control operation of the sensor(s) 15 connected thereto. In particular, the use of the sensor network peripheral 14 can enable the guest engagement system 10 to function with sensors 15 having minimal (or no) on-board processing power and memory, and sensors 15 requiring minimal configuration during initial system installation. In particular, through the use of the sensor network peripherals 14, the individual sensors 15 do not need to store individual network identifiers (e.g., unique network addresses) for use by the sensors 15 to identify themselves on the communication network 19 and to identify data transmitted by each respective sensor 15 on the network 19 as having originated in the respective sensor 15. Instead, the sensor network peripherals 14 are configured to package data received from sensors 15 connected thereto for communication across the network 19, and in particular are configured to associate with data received from each respective sensor 15 an identifier for the respective sensor 15. The sensor network peripherals 14 are further configured to packetize the data from the sensors 15 for communication across the network 19. Additionally, the individual sensors 15 do not need to be operative to communicate on the network 19, and each respective sensor 15 does not need to have processing power sufficient to identify and process packets destined for the respective sensor from among packets communicated across the network 19. Instead, the sensor network peripherals 14 are configured to process data communicated across the network 19 to identify packets destined for the respective sensor network peripheral 14 and/or for sensors 15 connected thereto, to process instructions included in the packets, and to control the appropriate sensor(s) 15 connected thereto according to the processed instructions.

As described above, the use of sensor network peripherals 14 thereby enables the wireless guest engagement system 10 to operate using low cost sensors 15 that do not include network communication circuitry and include no or minimal processing power and memory. Additionally, the use of sensor network peripherals 14 enables the wireless guest engagement system 10 to be configured for and begin operation without having to assign individual network identifiers to each sensor 15, and/or without having to configure the servers 21 with information on each individual sensor 15 in the system. Instead, the wireless guest engagement system 10 can be configured for operation by connecting multitudes of sensors 15 directly to nearby sensor network peripherals 14 located throughout the facility, and configuring the sensor network peripherals 14 for communication through the communication network 19 with the servers 21.

While the foregoing description has focused on sensor network peripherals 14 being directly connected to sensors 15 configured to sense the presence of and/or communicate with medallions 11, the sensor network 13 and the sensor network peripherals 14 can more generally support other types of sensors or devices (reference generally by numeral 16 in FIG. 1B). Specifically, the sensor network 13 and the sensor network peripherals 14 can be used to control operation of and relay sensing data from the other sensors or devices 16 through the communication network 19. The sensors or devices 16 may include sensors such as smoke or CO (carbon monoxide) sensors, infrared or occupancy sensors, photodiodes or light sensors, temperature and/or humidity sensors, and the like. The other sensors or devices 16 can also include devices such as speakers and/or microphones (e.g., parts of a public address (PA) system), actuators or controllers (e.g., for opening or closing vents or window shades), switches or relays (e.g., for turning on/off lights, heating and ventilation, power), cameras (e.g., as part of a security system), and the like. The sensor network peripherals 14 can further be configured to support sensors mounted in (or associated with) vending terminals 17*b*, interactive displays 17*c*, and other interface devices 17 described throughout this document.

The functionality provided by the sensor network peripherals 14 can also be incorporated into other components of the wireless guest engagement system 10. Notably, the functionality of the sensor network peripherals 14 can be incorporated into components that include a processor, memory, and a network transceiver for communication across the communication network 19. For example, as shown in FIG. 1B, an access panel 705 provided in association with a door lock 17*a* may be configured for use as a sensor network peripheral 14. Note that the access panel 705 is described in further detail below in relation to FIGS. 7A-7I. In the example of FIG. 1B, the access panel 705 can include at least one port and/or bus for connecting one or multiple sensors 15 thereto, and the access panel 705 may be configured to support operation of the sensors 15 as described above in relation to the sensor network peripherals 14.

Figure 2A:
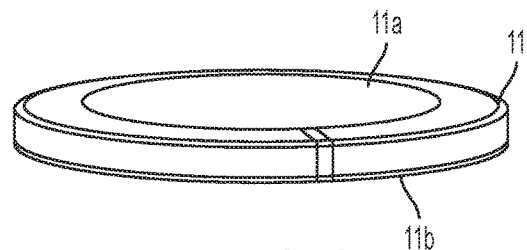

As detailed above, a guest device 11 can take the form of a medallion 11, such as the illustrative medallion 11 shown in FIG. 2A. As shown, the medallion 11 takes the form of a token having an outer diameter of approximately 1.25 inches (range of 0.75 to 2.5 inches), a thickness of approximately ⅜ inch (range of ⅛ to ⅝ inch), and a weight of approximately 1.8 ounces (range of 1.2-2.4 ounces).

Figure 2B:
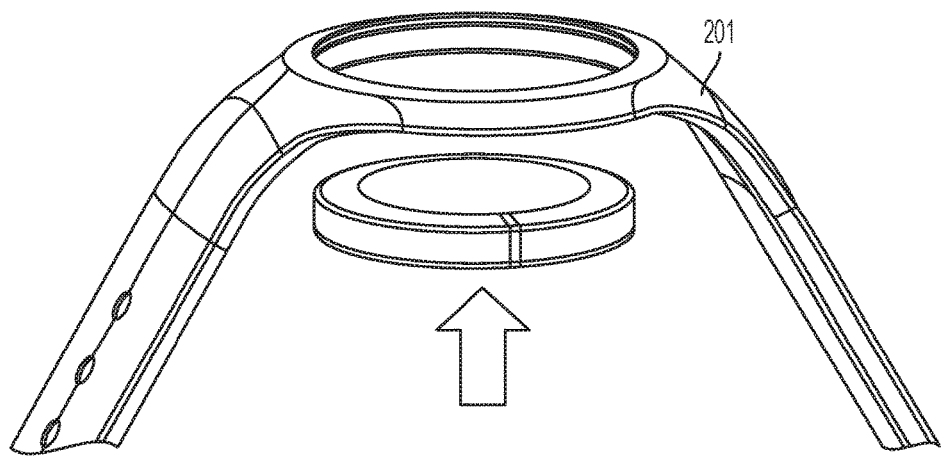
Figure 2C:
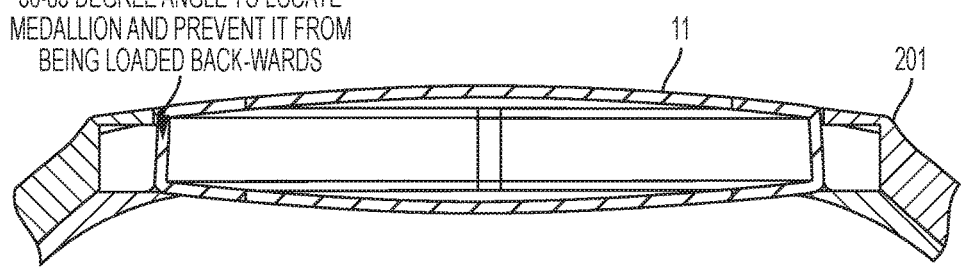

The medallion 11 is configured to be insertable into different accessories worn by guests 12. The accessories enable the medallions 11 to be securely attached to the guests 12 so as to ensure that guests do not inadvertently lose or misplace their medallions. FIG. 2B shows an illustrative accessory 201 that takes the form of a wrist-band or bracelet. Other types of accessories, including lanyards, pendants, keychains, necklaces, belt buckles, bathing suites (e.g., bikini rings), body piercings, and the like, some of which are shown in FIGS. 4A-4F, can also be used. The medallion 11 is configured to be inserted into a cavity of the wrist-band accessory 201 that is shaped and sized to receive the medallion 11. As shown, the medallion 11 is inserted via a rear of the wrist-band accessory 201, i.e., via a side of the accessory 201 that is designed to face the user, such as the inside surface of the wrist-band that is designed to contact a wrist of a user when the wrist-band is worn. The medallion 11 is inserted via a rear of the wrist-band accessory 201 so as to ensure that the medallion 11 cannot inadvertently slip out of the accessory 201 when the accessory 201 is worn by the user. In particular, as shown in FIG. 2C, the cavity of the accessory 201 configured to receive the medallion can be tapered and thus have an angled or chamfered edge ensuring that the medallion 11 can be inserted into cavity of the accessory 201 but cannot pass through the cavity and exit the accessory 201 through a front surface thereof. In the example of FIG. 2C, the edge is angled at approximately 3 degrees relative to a right-angled edge (corresponding to an angle of 87 degrees relative to the front or back surface). In detail, the cavity in the example of FIG. 2C may not have a cylindrical shape but may instead have a tapered shape, e.g. a frustum shape of a slice of a cone having a circular base and edges angled relative to the circular base at a predetermined angle (e.g., 3 degrees (+/−1 degree) relative to a right-angled edge, corresponding to an angle of 87 degrees (range of 86-88 degrees) relative to the front or back surface). The angle is such that the rear/lower opening of the cavity is larger than the front/upper opening, to thereby prevent the medallion 11 from passing through the cavity.

Similarly, the medallion 11 can tapered shape having an angled edge along is outer peripheral surface, and the edge may be angled with a predetermined angle equal to that of the cavity (e.g., 3 degrees (+/−1 degree) relative to a right-angled edge, corresponding to an angle of 87 degrees (range of 86-88 degrees) relative to the front or back surface), as also shown in FIG. 2C. The angled edge of the medallion is such that the medallion has a smaller dimension (e.g., smaller diameter) on the front/upper surface 11*a* of the medallion 11 relative to the back/lower surface 11*b* of the medallion 11. As such, the combination of angled edges of the medallion 11 and cavity in the accessory 201 ensure that the medallion can only be placed in the accessory 201 in such a way that the front surface 11*a* of the medallion 11 faces outwards while a back surface 11*b* faces rearwards. Additionally, the medallion 11 may be sized to be slightly smaller than the cavity so as to ease the fit of the medallion 11 within the cavity. For example, the medallion 11 may have an outer dimension, such as an outer diameter, that is 0.75 mm (e.g., range of 0.5-1 mm) smaller than the inner dimension/diameter of the cavity to enable the medallion 11 to be inserted into the cavity even in the medallion is not perfectly aligned with the cavity and/or is tilted with respect to the cavity.

In summary, the medallion can thereby easily and securely couple to the accessory 201 by virtue of the following features. The medallion 11 has an angled edge, sloping at a predetermined angle (e.g., 3 degrees) from the "front" surface of the medallion to the "rear" surface so as to align with the oppositely formed angled edge of the accessory 201. The angled edge design allows for alignment of the medallion 11 to the accessory by inserting the medallion in the "rear" side of the accessory. Since the medallion 11 can only be inserted into or removed from the rear of the accessory 201, the forces needed to dislodge the medallion 11 from the accessory 201 are rearward and thus opposed to a body of a guest wearing the accessory 201 (and/or opposed to another surface preventing the easy dislodging of the medallion) when the medallion is in the accessory 201. As such, the medallion 11 cannot readily be dislodged or removed from the accessory 201 when the accessory is worn 201.

The foregoing description has focused on medallions 11 having circular shapes, and corresponding cavities having circular shapes. However, this disclosure is not limited to such medallions and cavities. More generally, medallions 11 and corresponding cavities in accessories may have oval or other rounded shapes or square, rectangular, or other angular shapes (e.g., triangular, pentagonal, hexagonal, etc.). In each case, the medallions 11 and corresponding cavities may have tapered shapes including angled edges sloping at a predetermined angle (e.g., 3 degrees) from the "front" surface of the medallion to the "rear" surface so as to ensure that the medallion 11 can only be inserted into or removed from the rear of the accessory 201. In such cases, the medallions 11 may have front and rear surfaces having substantially similar (or identical) shapes and different dimensions so as to confer the tapered shape to the medallions 11, and the cavities in the accessories may similarly have front and rear openings having substantially similar (or identical) shapes and different dimensions so as to confer the tapered shape to the cavities.

Additionally, the medallion 11 and accessory 201 can include magnets used to ensure that the medallion 11 is automatically positioned in a predetermined rotational orientation with the cavity of the accessory 201 (e.g., self-alignment of the medallion 11 in the accessory 201). The magnets additionally provide magnetic adhesion between the medallion 11 and accessory 201 to reduce the chances of the medallion 11 coming loose from (and/or falling out of) the accessory 201. Different numbers of magnets can be used for this purpose. For example, two, three, four, or five or more magnets can be used. The magnets may be evenly spaced around peripheries of the medallion 11 and of the cavity or, more generally, can be spaced at predetermined locations around the peripheries selected such each magnet mounted in the medallion 11 aligns with a corresponding magnet mounted in the periphery of the cavity when the medallion 11 is inserted in a desired orientation in the cavity of the accessory.

Figure 3A:
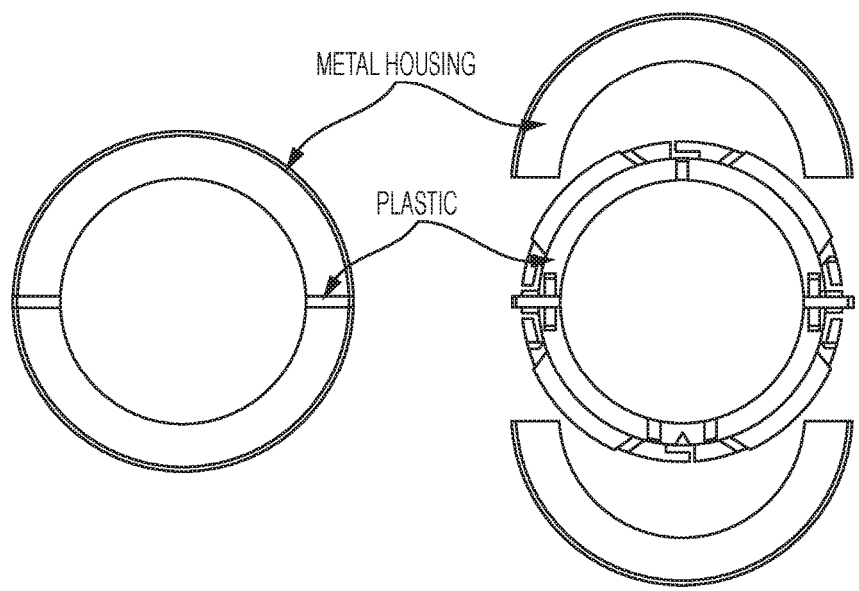

As shown in FIG. 2D, four magnets can be provided in the accessory 201 at positions aligned with four magnets provided in the medallion 11 to ensure that the medallion 11 is always orientated in the correct position in the X and Y axis. In particular, opposite polarity magnets can be provided at each location in the medallion 11 and accessory 201, as shown in FIG. 2E, so as to automatically align the medallion 11 in a particular rotational orientation relative to the accessory 201. For example, in the magnet coupling mechanism of FIG. 2E, the magnets on the top of the medallion 11 and accessory 201 (e.g., the "top" in the orientation shown in FIG. 2D) have polarities that are inverted relative to the magnets at the bottom of the medallion 11 and accessory 201 (e.g., the "bottom" in the orientation shown in FIG. 2D), so as to prevent the medallion 11 from being inserted rotationally upside down relative to the orientation shown in FIGS. 2D and 2E. This feature, along with the angled edges detailed in relation to FIGS. 2B and 2C, ensure that the medallion 11 can only be (or is preferentially) inserted into the accessory 201 in one orientation. As shown in FIG. 3A, the medallion 11 can have a metal outer rim and a plastic body disposed within the interior of the metal outer rim. Electronics included in the medallion 11 are mounted within the plastic body. The metal outer rim is interrupted in at least one location to form an open ring, and includes a plastic or other non-conducting spacer within the resulting gap. For example, in the embodiment of FIG. 3A, the metal outer rim is formed of two separate semi-circular metal housings that, when disposed along the outer rim of the medallion 11, are spaced part from each other by two diametrically opposed gaps. The gaps in the metal outer rim (or between metal outer rim parts) ensure that eddy currents cannot flow around the metal outer rim, and thereby ensure that eddy current flow does not significantly dampen the wireless communication capabilities of the medallions 11. Alternatively, as shown in FIG. 3E, the circular metal housing can include one or more gaps that are filled by injection molded plastic. As also shown in FIG. 3E, the circular metal housing can include indentations for placing magnets such as those described above in relation to FIGS. 2D-2E. In general, the metal outer ring is formed of a non-magnetic metal material and can be formed, for example, of burnished aluminum.

Figure 3B:
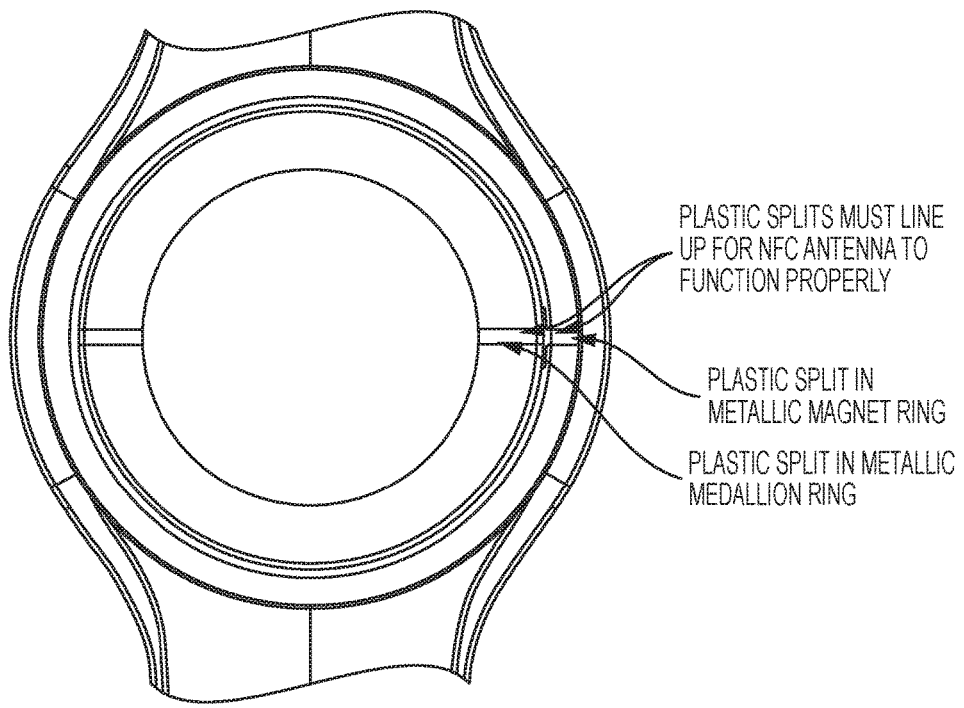

A similar gap in a metal outer rim can be included in accessories 201, as shown in FIG. 3B. In detail, in embodiments in which an accessory 201 is metallic or includes metallic components around the periphery of the cavity configured to house the medallion 11, the accessory 201 includes a gap in the metal outer rim of the cavity. The gap in the metal outer rim (or between metal outer rim parts) ensures that eddy currents cannot flow around the metal outer rim, and thereby ensures that eddy current flow does not significantly dampen the wireless communication capability of a medallion 11 housed in the accessory 201. To ensure proper function of the gaps in the metal outer rims of the medallion 11 and accessory 201, the gaps of the medallion 11 and accessory 201 should be aligned when the medallion 11 is mounted in the accessory 201. Specifically, the alignment of the gaps ensures that even if the outer metal rims of the medallion 11 and accessory 201 contact each other, the metal rims do not jointly form a closed metal loop around the electronics of the medallion 11. In order to ensure alignment of the gaps, magnets such as those described above in relation to FIGS. 2D and 2E can be used to provide a desired rotational alignment of the medallion 11 within the accessory 201. The geometry and polarity of the magnets are arranged so as to have the medallion self-orient in the accessory with the gaps in the metal outer rings aligned with each other (e.g., adjacent to each other or in contact with each other).

Figure 3C:
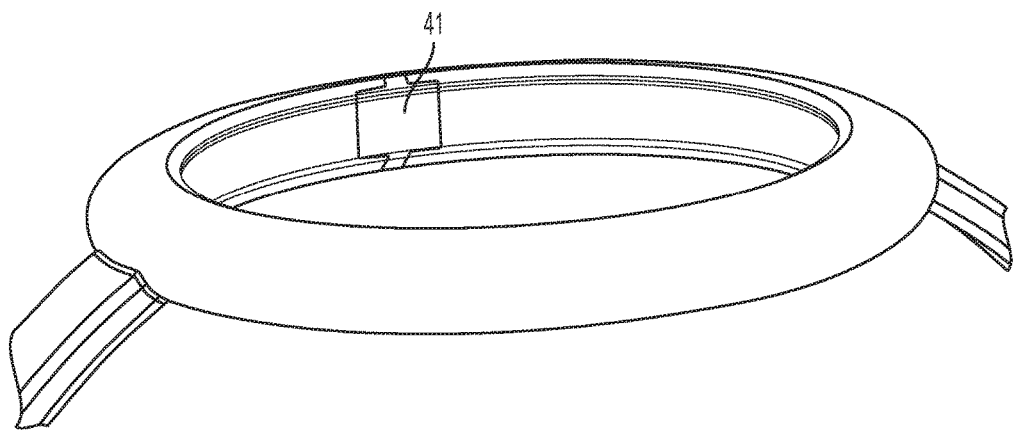
Figure 3D:
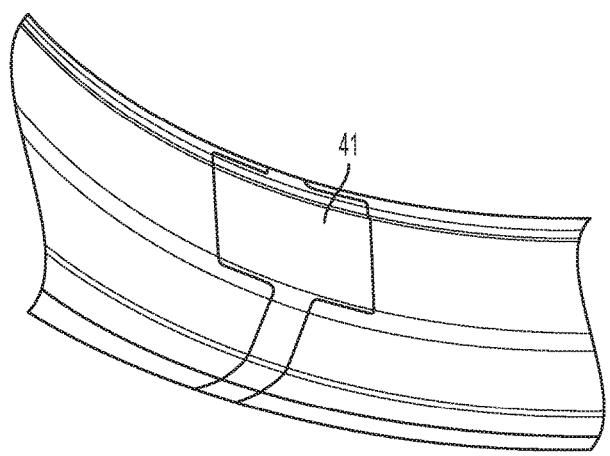
Figure 3E:
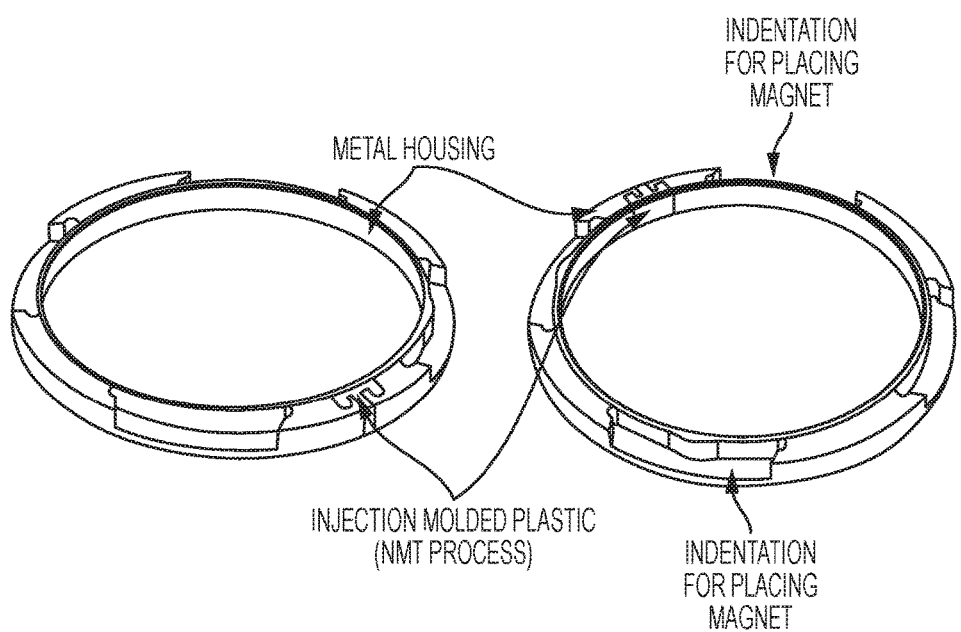

The gaps in the medallion 11 and in the accessory 201 have widths selected to ensure that a closed metal loop is not formed even if the medallion 11 and the accessory 201 are not in perfect alignment. Alternatively or additionally, an insulating liner 41 such as a plastic or other insulating liner shown in FIGS. 3C and 3D can be provided along an inner surface of the cavity in the accessory 201 housing the medallion 11. The insulating liner 41 can extend along an entire circumference of the cavity, or the insulating liner 41 can be located so as to contact the gap in the metal outer rim of a medallion 11 when the medallion 11 is mounted in the desired orientation in the accessory 201. The insulating liner 41 ensures that a metal rim of the accessory 201 does not form a short circuit across the gap in the metal outer rim of the medallion 11 by providing insulation between the gap in the metal outer rims of the medallion 11 and the accessory 201.

As shown in FIG. 2B, the accessory 201 can take the form of a wrist-band. However, other accessory formats can also be used. For example, FIGS. 4A-4E show various other types of accessories configured to have medallions 11 inserted therein. In this regard, FIG. 4A shows a sport band accessory including a sports band (made, e.g., of silicone), a retaining ring (made, e.g., of stainless steel and including a gap filled with a non-conducting material 31) that fits into the sports band and includes indentations for holding magnets, and a two-part clasp designed to close the band around a user's wrist. The retaining ring includes, in its center, the cavity configured to releasably house a medallion 11. FIG. 4B shows a clip (made, e.g., of aluminum) that includes a cavity configured to releasably house a medallion 11, and further includes a gap filled with a non-conducting material 31 around the periphery of the cavity. The clip may be attached to a keychain in some examples. FIG. 4C shows a cuff (made, e.g., of nylon) that includes a retaining ring (made, e.g., of stainless steel and including a gap filled with a non-conducting material such as plastic) that fits into the cuff and includes indentations for holding magnets. The retaining ring includes, in its center, the cavity configured to releasably house a medallion 11.

FIG. 4D shows a bracelet (made, e.g., of stainless steel including a gap 32 filled with a non-conducting material 31), and a retaining ring 33 (made, e.g., of stainless steel and including a gap filled with a non-conducting material 31)

that fits into the bracelet and includes indentations 34 for holding magnets. The retaining ring includes, in its center, the cavity configured to releasably house a medallion 11. FIG. 4E shows a pendant (made, e.g., of stainless steel including a gap 32 filled with a non-conducting material 31), and a retaining ring 33 (made, e.g., of stainless steel and including a gap filled with a non-conducting material 31) that fits into the pendant and includes indentations for holding magnets. The retaining ring includes, in its center, the cavity configured to releasably house a medallion 11. In some examples, the pendant is configured to attach to a decorative chain for wearing by a guest. In other examples, the pendant is configured to attach to a keychain or other item. Finally, FIG. 4F shows a mount configured to be worn using a watch-type band. The mount (made, e.g., of stainless steel including a gap filled with a non-conducting material) has a retaining ring (made, e.g., of stainless steel and including a gap filled with a non-conducting material 31) that fits into the mount and includes indentations for holding magnets.

The accessories shown in FIGS. 4A-4E are non-limiting examples of accessories in which medallions 11 can be mounted. However, other types of accessories, including lanyards, pendants, keychains, necklaces, belt buckles, bathing suites (e.g., bikini rings), body piercings, and the like, may also be used.

Figure 5C:
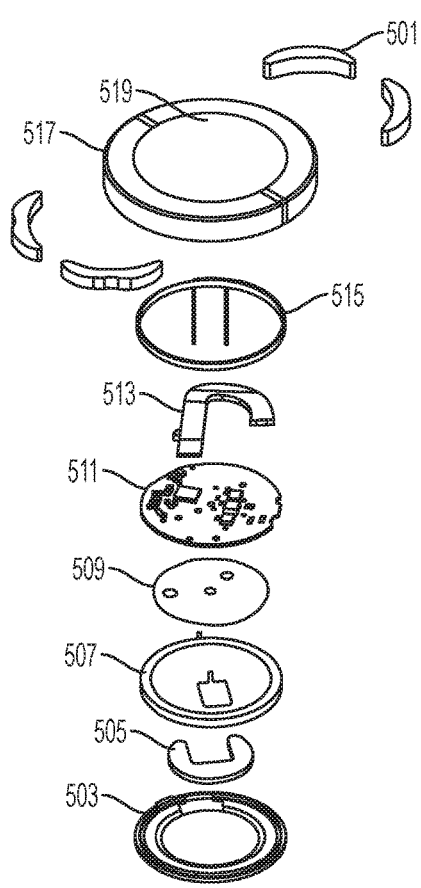

The foregoing description of the medallions 11 has focused on external attributes of the medallions 11, such as the medallions shown in FIG. 5A. Specifically, FIG. 5A shows top, bottom, and side views of an illustrative medallion 11. The following description of FIGS. 5B-5E details internal structures of various embodiments of the medallions.

Figure 5D:
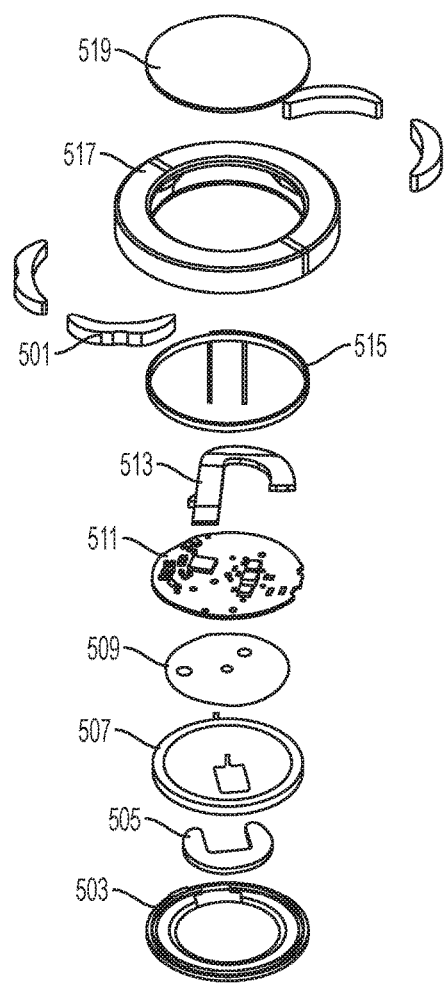
Figure 5E:
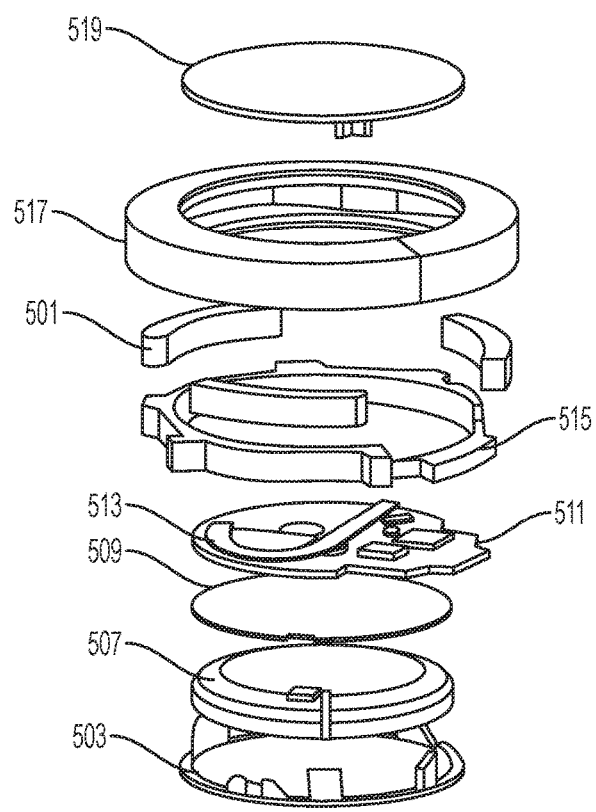

As shown in FIGS. 5B, 5C, 5D, and 5E, different embodiments of medallions 11 include magnets 501, a bottom cap 503, a foam filler 505, a battery assembly 507 (e.g., a CR2025 battery), an insulation film spacer 509, a printed circuit board assembly (PCBA) 511, a BLE antenna 513 (e.g., a J-shaped BLE antenna), an NFC antenna 515 (e.g., a wound wire coil antenna), a metal housing 517 (e.g., of aluminum), and a top cap 519. The BLE antenna 513 can be soldered to an upper surface of the PCB 511, while the NFC antenna 515 may be connected to the PCB 511 by pogo pins. In the embodiment of FIG. 5E, the NFC antenna 515 is coated in silicone for durability. As shown in FIG. 5B, the magnets 501 may fit within indentations provided in the top cap 519 (or, alternatively, in the bottom cap 503) and be held in place by the indentations. Alternatively, as shown in FIG. 5E, the magnets 501 may fit within indentations provided in the silicone coating the NFC antenna 515 and may be held in place by the indentations.

In the embodiment of FIGS. 5B, 5D, and 5E, the metal housing 517 is manufactured separately from the bottom and top caps 503 and 519. The metal housing 517 may be made of aluminum or other metal, while the bottom and top caps 503 and 519 may be made of plastic. In contrast, in the embodiment of FIG. 5C, the top cap 519 is integrally formed with the metal housing 517. For example, in the embodiment of FIG. 5C, the top cap 519 and metal housing 517 may be machined out of a block of material including metal and plastic materials disposed within the block such that, following machining, the top cap 519 has an open metal ring (e.g., at 517) disposed around its outer peripheral surface that is interrupted by one or more gaps that are filled with plastic or other insulating material. Additionally, following machining, the top cap 519 has a plastic (or insulating) center. For this purpose, the block of material used for machining may be a plastic-impregnated metal.

Figures 5F, 5G:
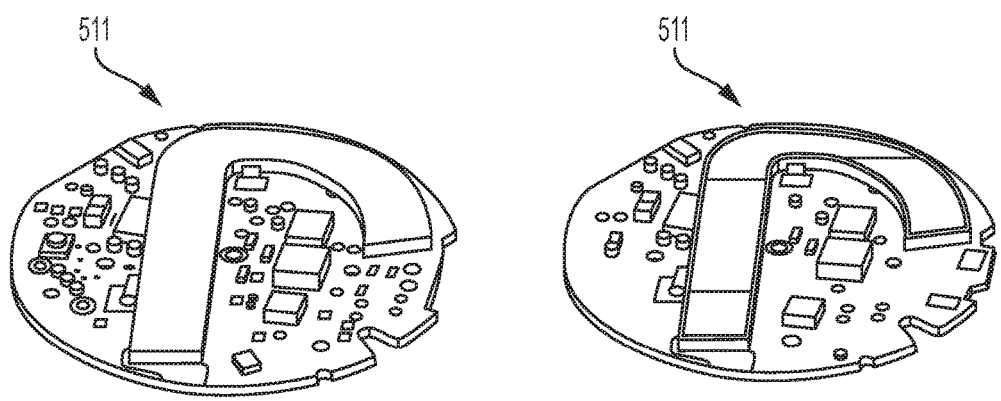
Figure 5J:
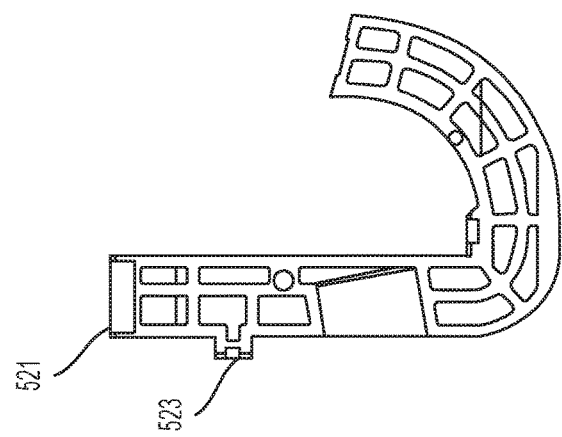

FIGS. 5F and 5G show detailed views of PCB assemblies 511 used in medallions 11, which show in detail the J-shaped BLE antenna mounted on an upper surface of the PCB. As shown in FIG. 5F, the J-shaped BLE antenna can be formed of stamp-cut steel, include machine-bent tabs, and include alignment pins for placement on the PCB. The pins may also provide connection to ground and feed pads. As shown in FIG. 5G, the J-shaped BLE antenna can be formed using a laser direct structuring (LDS) process as an injection-molded plastic part plated with metal, and may include snap features on a bottom of the molded part for use in placement and alignment on the PCB.

Figure 5L:
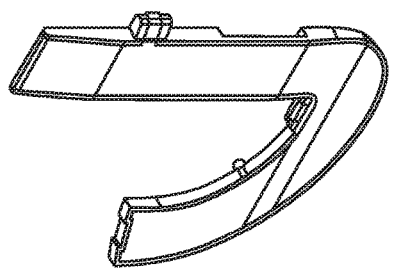

Detailed schematics of the J-shaped BLE antenna are provided in FIGS. 5H-5L. FIGS. 5H-5K show detailed schematic views of the BLE antenna provided from front, side, rear, and bottom views, respectively, while FIG. 5L provides a perspective view of the BLE antenna. Dimensions of the antenna and design tolerances on the dimensions are provided in the figures in millimeters (mm). The dimensions provided are illustrative, and the BLE antenna can be scaled up or scaled down relative to the dimensions shown depending on the particular application in which the BLE antenna element is to be used. In the embodiment shown in the figures, the dimensions of the antenna are set such that an overall length of the antenna enables the antenna to resonate at a desired frequency in the 2.4 GHz range, for example by setting an overall length of the radiation element to approximately ¼ wavelength at 2.4 GHz. Moreover, the radius of curvature of the J-shaped antenna may be set to maximize the radius of curvature of the antenna within the space constraints imposed by the cavity of the medallion within which the antenna is located while ensuring that the antenna does not contact a metallic outer ring of the medallion.

In embodiments in which the J-shaped BLE antenna is formed using a laser direct structuring (LDS) process as an injection-molded plastic part plated with metal, the rear surface (shown in FIG. 5J) may be formed of the injection-molded plastic part while the front surface (shown in FIG. 5H) may be substantially fully plated with metal. The metal plating formed on the front surface may extend to the rear surface, and may notably extend to those portions of the rear surface shown in gray shading in FIG. 5J. In particular, the metal plating may extend along a top edge 521 of the J-shaped antenna to the rear surface of the antenna and thereby provide an antenna ground terminal that is electrically connected to a ground terminal of the PCBA 511. The metal plating may further extend onto a side protrusion 523 of the J-shaped antenna to the rear surface of the antenna and thereby provide an RF signal terminal that is electrically connected to the PCBA 511. In operation, the PCBA 511 may thus apply signals between the ground terminal (at 521) and the RF signal terminal (at 523) in order to emit BLE signals using the antenna, and may sense signals at those terminals in order to receive BLE signals using the antenna.

Figure 5I:
Figure 5H:
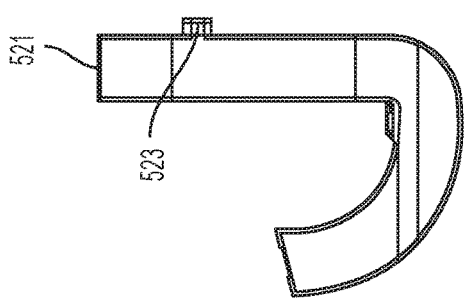
Figure 5K:

Additionally, as shown in the cross-sectional view shown in FIG. 5I, the J-shaped antenna has a non-planar profile including two bend points used to elevate the antenna element above the ground plane of the PCBA 511. By spacing the antenna element high above the ground plane, the antenna element is capable of radiating more RF energy. Finally, corners of the J-shaped antenna can be formed by laser trimming so as not to be right angled (90 degree) in order to enable fine frequency tuning.

Figure 6:
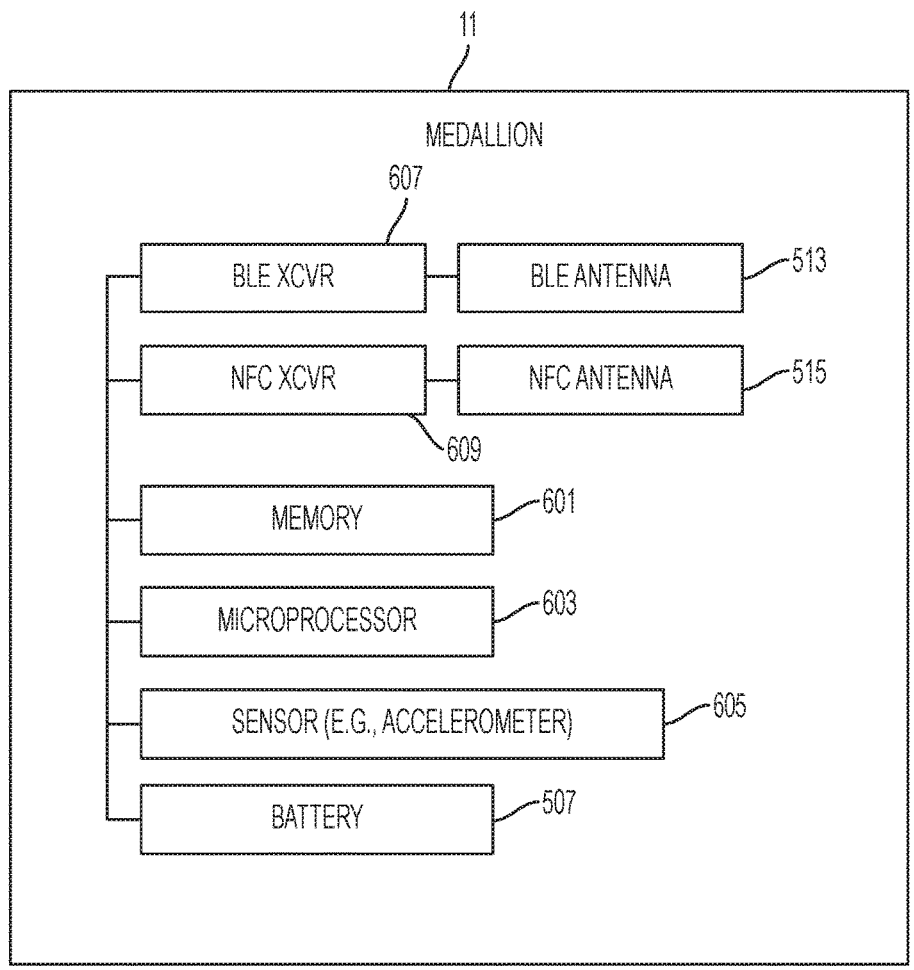
FIG. 6 is a block diagram showing functional components of a medallion.

FIG. 6 is a block diagram showing functional components of a medallion 11. The components shown in FIG. 6, including the microprocessor 603, memory 601, transceivers 607 and 609, and sensor 605, form part of the PCBA 511 shown in FIGS. 5B-5E.

As shown in FIG. 6, the medallion 11 includes a memory 601, microprocessor 603, optional sensor(s) 605 such as an accelerometer, one or more transceivers 607, 609 and associated antennas 513, 515, and the battery 507. The components may be communicatively and/or electrically connected to each other by circuits integrated in the PCB of the PCBA 511. In particular, the memory 601 is communicatively connected to the microprocessor 603, such that machine-executable programming instructions stored in the memory 601 can be executed by the microprocessor 603 to cause the medallion 11 to perform functions such as those described throughout this disclosure. In addition to programming instructions, the memory 601 stores a unique identifier used by the guest engagement system 10 to uniquely identify each medallion. The memory 610 can also store encryption and decryption keys, and encrypted data. For example, in one example, the memory stores both a public identifier for the medallion 11 that uniquely identifies the medallion and is broadcast in the beacon signal emitted by the medallion, and a private identifier that also uniquely identifies the medallion, is stored in an encrypted format in the memory, and is used to securely authenticate the medallion (e.g., for use in payments and for unlocking doors). Additionally, the microprocessor 603 is communicatively connected to one or more optional sensors 605, such as an accelerometer sensor, and to one or more transceivers 607, 609.

As noted above, the medallion includes at least one transceiver and associated antenna configured for wireless communication with the guest engagement system 10. As shown, the medallion 11 includes two transceivers each operating according to a different communication standard. In the example, a first transceiver 607 operates according to the BLE standard, and is connected to an associated antenna 513 used for BLE communications, while a second transceiver 609 operates according to the NFC standard (e.g., a radio-frequency identification (RFID) standard), and is connected to an associated antenna 515 used for NFC communications. While each transceiver is shown as having a dedicated antenna in FIG. 6, in some embodiments two or more transceivers may share a same antenna.

As described above, the BLE transceiver and antenna is used by the medallion 11 to emit periodic beacon signals that enable the guest engagement system 10 to determine the location and identity of a guest and provide services to the guest. The BLE transceiver and antenna can also be used for secure communications. The operation of the BLE transceiver and antenna, however, generally requires that the battery 507 provides sufficient power to the medallion 11 for operation. When the charge level of the battery 507 falls below a threshold, and/or the battery or BLE transceiver fails, the medallion 11 may be unable to communicate using BLE signals. In such situations, the medallion can nonetheless operate as a passive NFC/RFID device. In particular, to function as a passive NFC/RFID device, the medallion does not require any power from the battery for operation. Instead, the medallion operates based on power harvested through the NFC antenna from radio frequency signals inducing current flow in the antenna. When operating as a passive NFC/RFID device, the medallion may be configured to transmit signals including the medallion's unique identifier in response to receiving RFID interrogation signals or other signals inducing sufficient current flow in the antenna.

The guest engagement system 10 may thus be able to provide limited services to guests even if the guests' medallions do not receive sufficient operating power from their batteries.

When the battery 507 provides sufficient power for operation of the BLE transceiver, the medallion 11 is configured to operate using three distinct modes of operation. Specifically, the memory 601 stores programming instructions which, when executed by the microprocessor 603, cause the medallion 11 to operate according to a selected one of the three modes of operation. Initially, when a medallion 11 is first activated by being provided with a battery 507, the medallion 11 operates in the sleep mode of operation. The sleep mode of operation is a very low power mode of operation which conserves battery power. In the sleep mode of operation, the medallion 11 listens periodically for network advertisements from a recognized guest engagement system 10 and remains in the sleep mode of operation as long as an advertisement is not received from a recognized guest engagement system 10. In the sleep mode of operation, the medallion 11 listens for network advertisements on a periodic schedule—such as once every 30 seconds, once every minute, once every 5 minutes, or the like. If a network advertisement is received during a periodic listen period, the medallion 11 determines whether the advertisement is for a recognized guest engagement system 10 and, upon determining that the advertisement is from a recognized guest engagement system 10, the medallion 11 switches to the bi-directional mode of operation.

In the bi-directional mode of operation, the medallion 11 is configured to both emit a beacon signal via the BLE transceiver 607 and antenna 513, and to listen for communications from the recognized guest engagement system 10 via the BLE transceiver 607 and antenna 513. The medallion 11 may additionally listen for communications via the NFC transceiver 609 and antenna 515 in the bi-directional mode of operation. The medallion 11 listens for communications from the recognized guest engagement system 10 on a periodic basis in the bi-directional mode of operation, for example every 10 ms, every 100 ms, or the like. Further detailed information on the bi-directional mode of operation is provided below in relation to the description of the door lock. The medallion 11 may continue to operate in the bi-directional mode of operation until the medallion 11 receives a communication from the recognized guest engagement system 10 causing the operating mode to switch to the beacon mode of operation. The bi-directional mode of operation may consume higher power than the sleep mode of operation.

In the beacon mode of operation, the medallion 11 is configured to emit the beacon signal via the BLE transceiver 607 and antenna 513. Optionally, the medallion may periodically listen for communications from the recognized guest engagement system 10 via the BLE transceiver 607 and antenna 513, but the listen time periods occur less frequently (e.g., every second, every 5 s, or the like) in the beacon mode of operation than in the bi-directional mode of operation. As a result, the beacon mode of operation is associated with a lower power consumption than the bi-directional mode of operation, but a higher power consumption than the sleep mode of operation. The periodic listen periods in the beacon mode of operation are used to listen for communications from the recognized guest engagement system 10 causing operation mode to switch to the bi-directional mode of operation.

In both the bi-directional and beacon modes of operations, periodic beacon signals are transmitted from the medallion 11. In general, the beacon signals include a unique identifier of the medallion, and are transmitted on a periodic basis (e.g., every 10 ms, every 100 ms, every second, or the like). The beacon signals can be sensed by sensors 15 of the recognized guest engagement system 10, and used by the guest engagement system 10 to determine the approximate position of the medallion 11 within the facility. The beacon signals are also used by the recognized guest engagement system 10 to provide services to the guest, as described in more detail below.

The medallions 11 communicate wirelessly with the sensors 15 of the recognized guest engagement system 10 to enable the guest engagement system to provide automated engagement with users or guests of the facility in which the sensors 15 are mounted. While the sensors 15 can be mounted throughout the facility, some sensors 15 are mounted in or otherwise associated with a particular interface device 17 or interface function of the system. As shown in FIG. 1A, interface devices 17 include door locks 17a, automatic doors or turnstiles, vending terminals 17b, cash registers, slot machines, interactive displays 17c or portals 17d, and the like. A particular interface device 17, which provides functionality of a door lock 17a, is described in detail below with respect to FIGS. 7A-7I.

The door lock 17a provides guests the ability to gain access to their cruise ship stateroom, resort room, or other limited access facility (e.g., a VIP lounge, spa, fitness facility, elevator bank, or the like) simply by walking up to the door, reaching out to grasp the handle, and opening the door that is automatically unlocked based on wireless communications with the guests' medallions 11. Specifically, the door lock 17a detects the presence of a medallion 11 in front of (or in close proximity to) the door and unlocks the door for permitted guest(s) or service personnel (e.g., stateroom stewards, maids, or facilities engineers). Additionally, the door lock 17a can include a display panel that provides a visual and audio greeting to the guest and can provide real-time information about the guest's up-coming activities, and/or messages from the crew, staff, or other members of the guest's party. The door lock display panel can include a panel-mounted camera used to record images and video of unauthorized persons attempting to access the room as well as images of crew, staff members, and others who access the room.

Figure 7A:
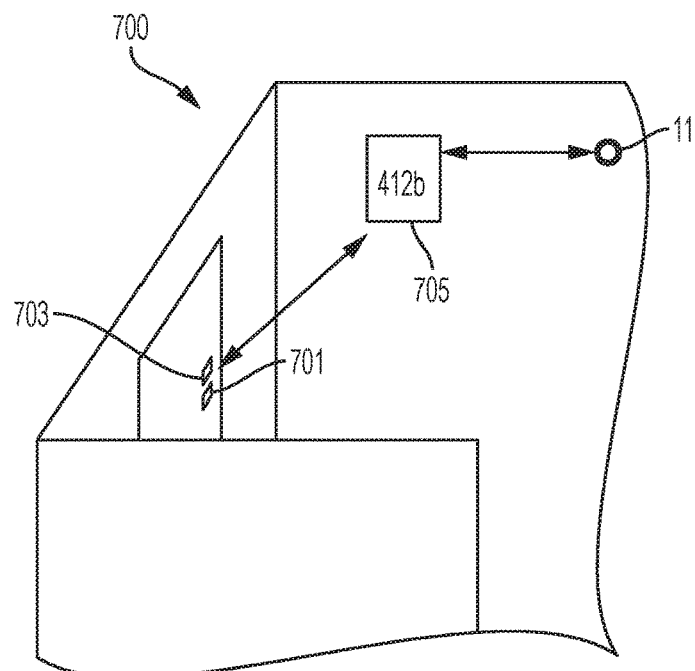
Figure 7B:
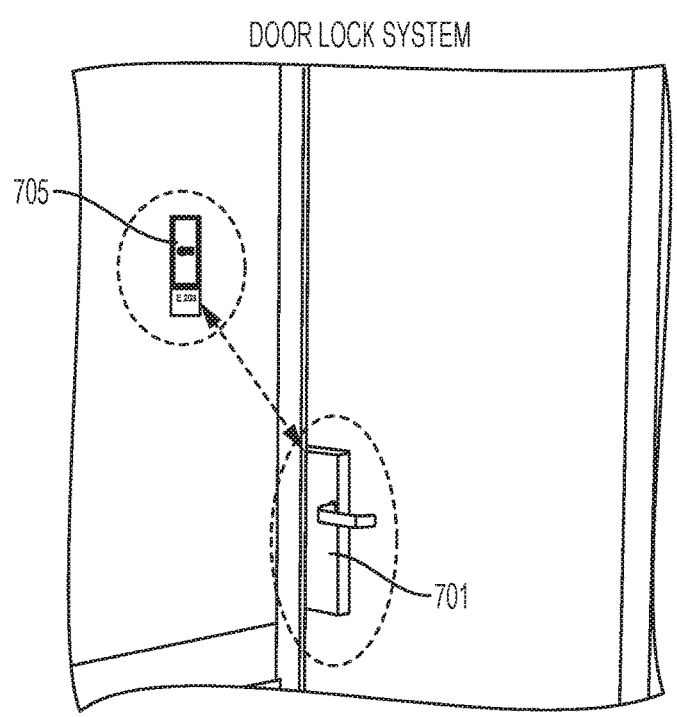

FIGS. 7A-7I illustratively show an automated door lock assembly 700 that provides the functionality of the door lock 17a to automatically unlock a door based on an interaction with a guest's medallion 11. As shown in FIG. 7A, the automated door lock assembly 700 can be used on a ship (e.g., a cruise ship) or a hotel to selectively unlock the door of a guest's room (e.g., a state room or hotel room). Specifically, the automated door lock assembly 700 can be used to selectively unlock the door of a guest's room to allow entry into the room. In general, the door remains unlocked at all times from the inside of the room, to allow guests to exit the room unimpeded.

Figure 7C:
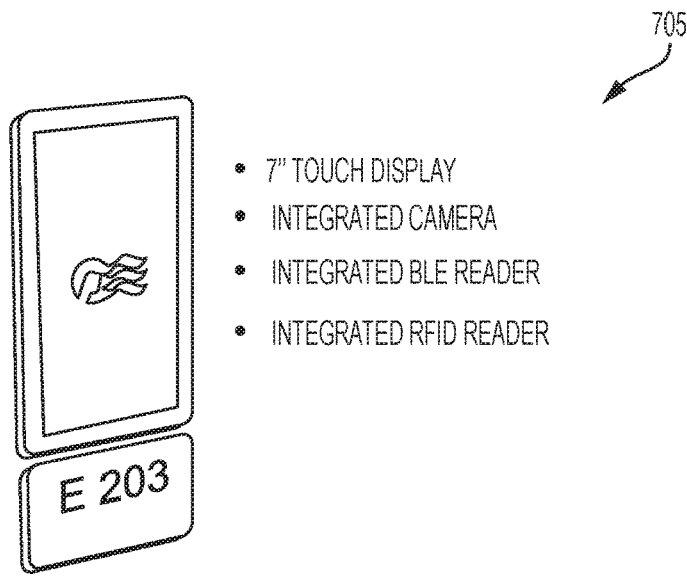
Figure 7D:
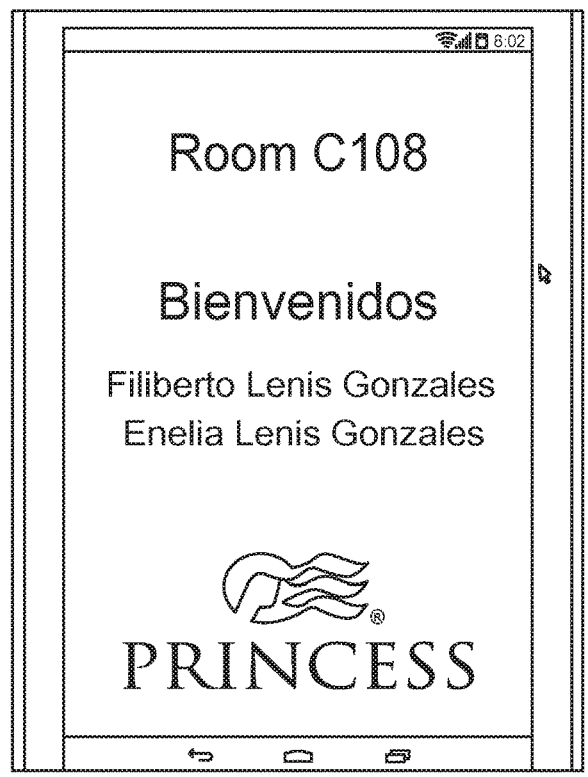
Figure 7E:
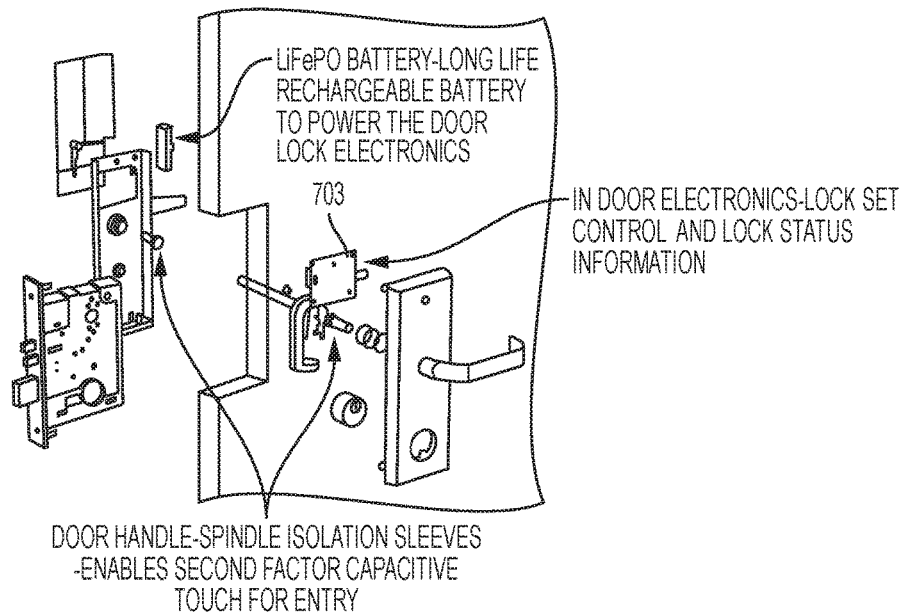
Figure 7F:
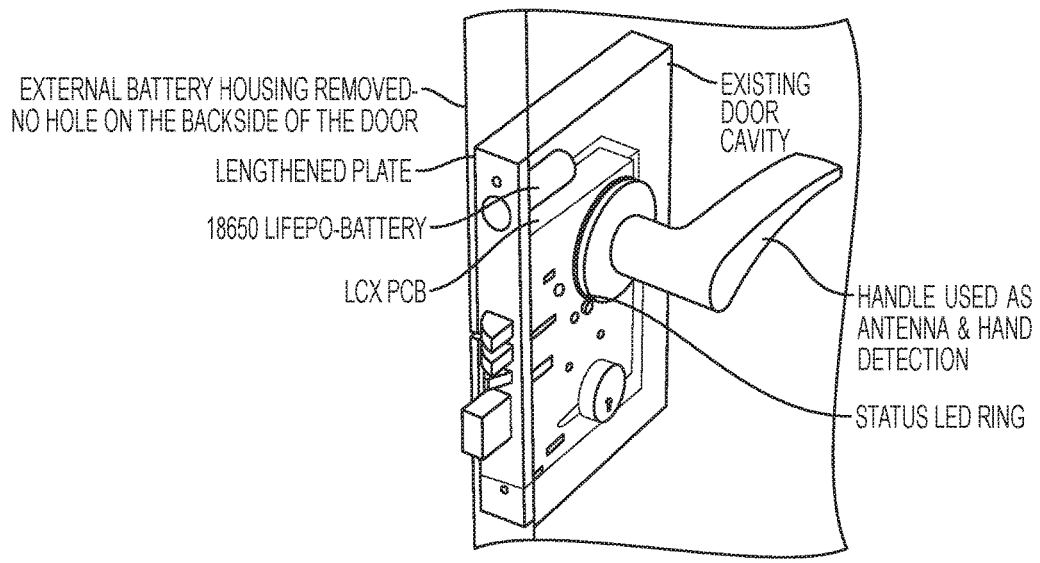
Figure 7G:
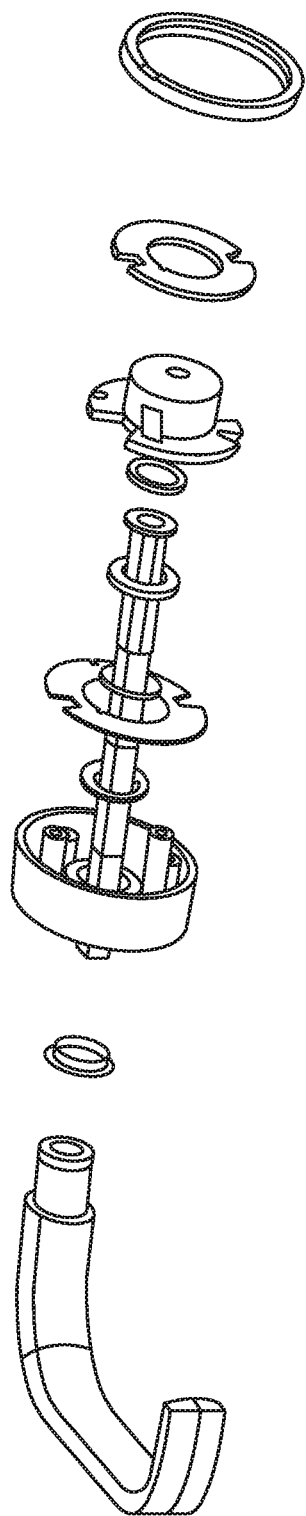

The automated door lock assembly 700 includes a latch assembly 701 shown in more detail in FIGS. 7E, 7G, and 7I, a door lock module 703 that selectively unlocks the latch assembly 701, and an access panel 705 mounted proximate to the door. The latch assembly 701 includes a latch and a door handle, knob, or other mechanical component(s) that provide door handle/knob functionality, and is generally mounted within the door that it controls. The latch assembly 701 also includes an electronically controlled locking and unlocking mechanism, such as a locking mechanism controlled by a solenoid. The locking and unlocking mechanism of the latch assembly 701 is controlled by the door lock module 703, which is an electronic module operative to send locking and unlocking signals to the electronically controlled locking mechanism. The latch assembly 701 will generally also include a mechanical locking and unlocking mechanism, such as a key-based mechanism that enables the door to be unlocked using a physical key.

The door lock module 703 is electrically connected to the latch assembly 701, and more specifically to the locking mechanism of the latch assembly 701, by a wire or other conductor. The door lock module 703 generally is battery powered and is mounted within the door, although the door lock module 703 can be placed in different locations depending on implementation. A same battery may be used to power both the door lock module 703 and the electronically controlled locking and unlocking mechanism of the latch assembly 701. In addition to controlling the electronically controlled locking mechanism, the door lock module 703 communicates wirelessly with the access panel 705 from which it receives instructions to unlock the door.

The access panel 705 communicates wirelessly with the door lock module 703, and provides instructions to unlock the door to the door lock module 703. The access panel 705 also communicates wirelessly with guests' medallions 11 and determines, based on a secure read of information stored in a guest's medallion 11, whether or not to instruct the door lock module 703 to unlock the door. The access panel 705 additionally communicates with a central reservation server 21 of the guest engagement system 10 to securely retrieve information on guests permitted access to the door, and determines whether or not to instruct the door lock module 703 to unlock the door based on whether the information obtained from the guest's medallion 11 (e.g., a unique encrypted identifier) matches that of a guest permitted access to the door. While the access panel 705 can be battery powered, the access panel 705 generally receives power from an external source (e.g., via power over Ethernet (POE)). In some examples, the access panel 705 communicates wirelessly with the central reservation server 21, for example via a Wi-Fi network. Generally, however, the access panel 705 is connected to a wired network (e.g., an Ethernet network) through which it communicates wirelessly with the central reservation server 21 and through which it receives electrical power for operation. Note that the access panel 705 may be connected to an uninterruptible power supply (UPS) so as to be able to continue to function even if power received from a power grid or generator is interrupted.

FIGS. 7C and 7D provide detailed views of an illustrative access panel 705. As shown in the figures, the access panel includes a flat-panel display (e.g., a 7" touch sensitive display), an integrated camera, and wireless transceivers and associated antenna(s) for communicating with medallions 11 via BLE and/or NFC. The flat-panel display can be used to provide greetings to guests for whom the door in unlocked, to provide information to guests for whom the door in not unlocked, as well as to provide other information. Further functions of the access panel 705 are described in more detail below.

FIGS. 7E, 7G, and 7I provide exploded views of the latch assembly 701, including the door handle/knob and door latch mechanism. Additionally, FIG. 7E shows the door lock module 703 that can be located within the casing of the latch assembly 701 and that controls operation of the electronically controlled unlocking mechanism of the latch assembly 701.

Additionally, as shown in FIGS. 7E, 7G, and 7I, the latch assembly 701 includes electrical isolation sleeves mounted on the spindle of the door handle and configured to electrically isolate the door handle from other portions of the latch assembly 701. For example, the electrical isolation sleeves may isolate the door handle from the latch mechanism. The electrical isolation of the door handle can enable the door handle to be used by the door lock module 703 as a communication antenna for its ISM radio. The electrical isolation of the door handle can further enable the door lock module 703 to monitor a capacitance of the door handle and identify changes in the capacitance of the door handle. In one example, the door lock module 703 measures changes in an electrical potential of the door handle by charging the door handle to a nominal voltage (e.g., 0.05 V) and determining when the electrical potential of the door handle has returned to zero. The monitoring of capacitance performed by the door lock module 703 enables the door lock module 703 to determine when a person touches, contacts, or is in close proximity (e.g., less than a few centimeters) to the door handle so as to activate the unlocking mechanism of the latch assembly 701 only when a person contacts or is in close proximity to the door handle.

FIG. 7F shows a semi-transparent view of an alternative latch assembly 701. As shown, the latch assembly includes an LED status indicator, shown as a translucent ring-shaped indicator disposed around a base of the door handle, that is used to provide status information of the door latch assembly. In one example, the LED status indicator may provide green illumination when a guest is authorized to open the door and provide red illumination when a guest is denied authorization to open the door.

Figure 7H:
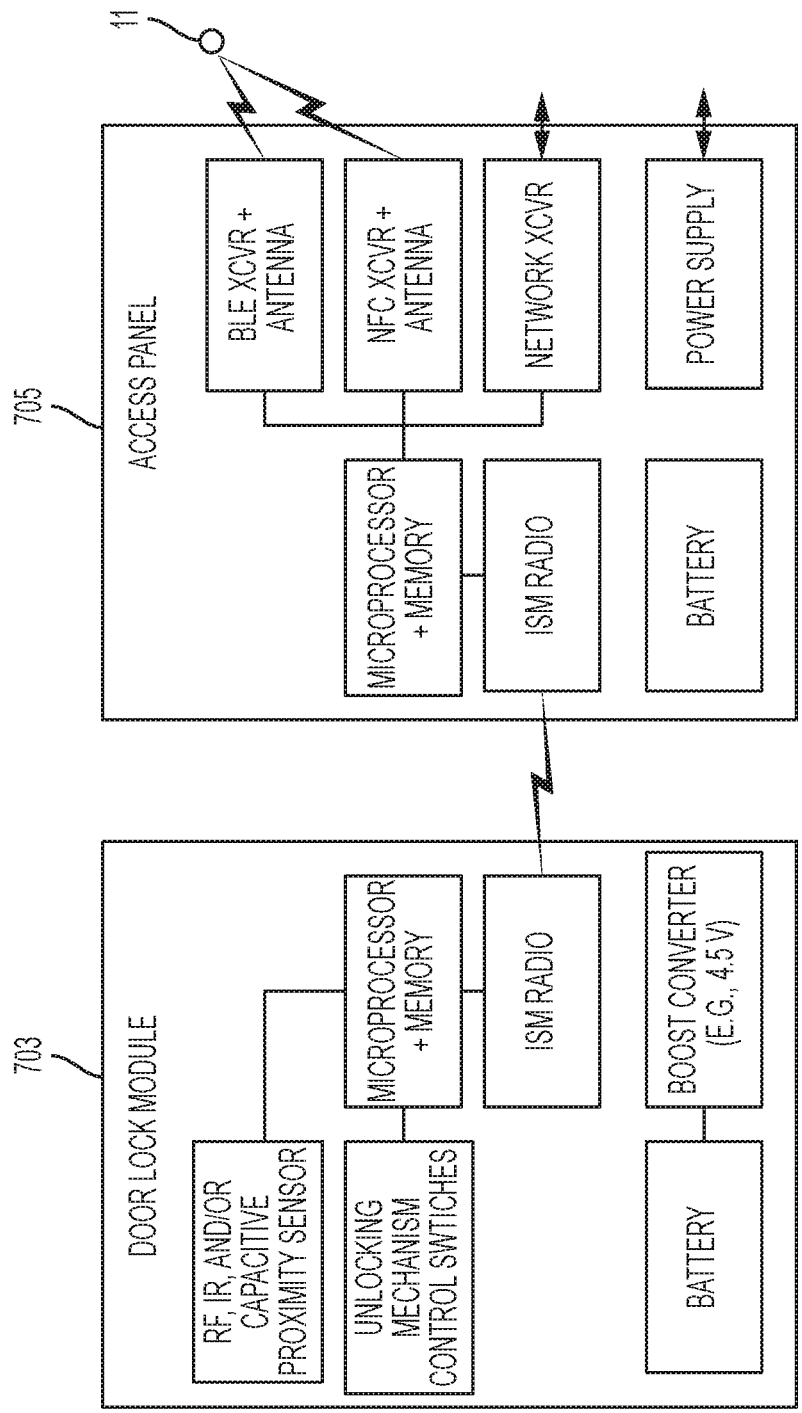
Figure 71:
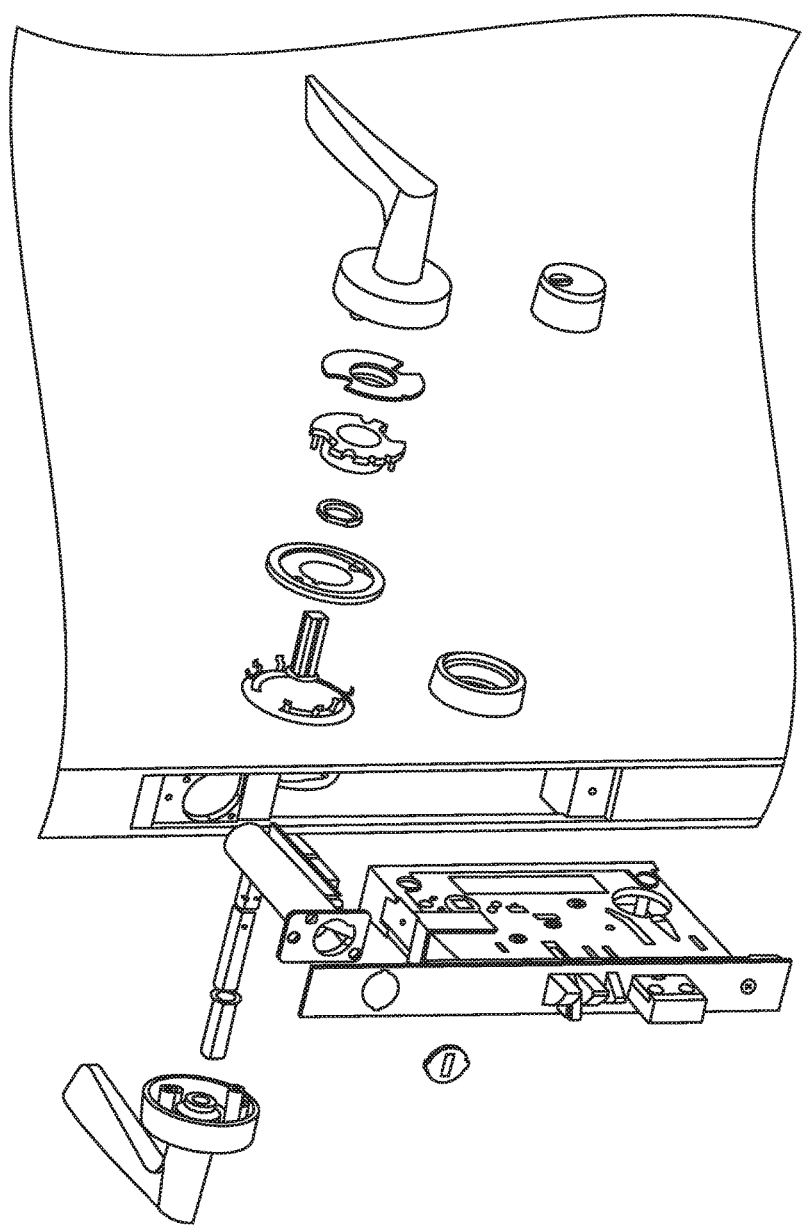

FIG. 7H is a block diagram illustratively showing components of the door lock module 703 and of the access panel 705. As shown in FIG. 7H, the door lock module 703 includes a microprocessor controlling operation of the door lock module 703, and a memory storing instructions for execution on the microprocessor. The door lock module 703 additionally includes a sensor, such as a radio frequency (RF), infrared (IR), or capacitive proximity sensor, used to determine when a guest's hand contacts or comes into close proximity to the door handle. The door lock module 703 additionally includes a short-range radio, such as a radio operating on the ISM band, for encrypted wireless communication with the access panel 705. The door lock module 703 is powered by a battery and a voltage boosting converter such as a 4.5 V boost converter.

The access panel 705 includes a microprocessor controlling operation of the access panel 705, and memory storing instructions for execution on the microprocessor. The access panel 705 additionally includes a short-range radio, such as a radio operating on the ISM band, for encrypted wireless communication with the door lock module 703. The access panel 705 can include a back-up battery for providing back-up power, and generally includes a power supply receiving electrical power from an external source such as power received over an Ethernet cable. The access panel 705 additionally includes one or more transceivers and associated antennas for communicating with medallions 11, such as a BLE transceiver and antenna and an NFC transceiver and antenna. In some examples, the antenna(s) of the access panel 705 are specifically designed to wrap around an outer edge of the display of the access panel 705. Additionally or alternatively, the access panel 705 may be associated with (and connected to) a spotlight sensor 15 that is disposed on a ceiling directly in front of the door, and operation of the access panel 705 may be based on beacon signals detected by the spotlight sensor 15 and emitted from medallions 11 of guests located directly in front of the door. Additionally, a network transceiver enables the access panel 705 to communicate across a wired or wireless network, such as across the communication network 19 of the guest engagement system 10 with a central reservation server 21. In general, each access panel 705 is associated with one particular door that it is located adjacent to, and the access panel 705 is associated one-to-one with the door lock module 703 of that one door such that the access panel 705 can only control unlocking of the one door and the door lock module 703 operates in response from commands from only that access panel 705.

In operation, the latch assembly 701 generally maintains the door in a locked state as a default. The access panel 705 maintains its BLE transceiver (or the BLE transceiver of the associated sensor 15) activated so as to detect any beacon signals transmitted by medallions 11 operating in proximity to the access panel 705. For this purpose, the access panel 705 and/or its associated sensor 15 may be configured to detect beacon signals transmitted by recognized medallions that are within a range of 2-4 feet from the access panel. Thus, when a recognized medallion 11 enters the read range of the access panel 705 and/or its associated sensor 15, the access panel 705 begins to receive the periodic beacon signals transmitted by the medallion 11 and initiates a door unlocking sequence.

First, based on the timing of receipt of a recognized beacon signal, the access panel 705 determines when the next time period during which the medallion will listen for communications from the guest engagement system 10 will occur. In turn, during the determined time period, the access panel 705 initiates a secure connection to the medallion 11 across which the access panel 705 can request the medallion's unique private identifier (e.g., using encryption such as elliptic curve cryptography (ECC) encryption). The unique private identifier can take the form of an encrypted code, such as a 48 byte encrypted code, that uniquely identifies the medallion 11. In response to the request, the access panel 705 and medallion 11 establish a secure and/or encrypted communication channel over which the medallion provides its unique private identifier to the access panel 705. In general, the unique private identifier is communicated over an encrypted BLE connection. Once the unique private identifier is received, the access panel 705 activates a lock control unit (LCU) that is operative to consult a local memory to determine whether the guest associated with the unique private identifier and medallion 11 are allowed access to the door at the current time. For this purpose, the access panel 705 maintains in local memory a white list including records of medallions' unique private identifiers that are allowed access to the door at the current and future times. If the unique private identifier received from the medallion 11 is encrypted, the LCU decrypts the identifier and determines whether the decrypted identifier is on the white list. If the access panel 705 determines that the guest associated with the unique private identifier and medallion 11 is allowed access to the door at the current time (e.g., the unique private identifier is included in the white list), the access panel 705 displays a welcome message on its display screen and initiates door unlocking. In the alternative, if the access panel 705 determines that the received identifier is not listed in the record of identifiers that are allowed access to the door, the access panel 705 consults a reservation server 21 across the network 19 to retrieve updated information (if any) on medallion identifiers that are allowed access to the door. In turn, if the received identifier is not listed among the updated information, the access panel 705 determines that the guest is not allowed access to the door at the current time and optionally activates its camera to capture a picture of the guest and transmits the picture to a central server 21. Note that in cases in which the access panel 705 detects multiple medallions 11 within its vicinity, the access panel 705 performs the above steps for each detected medallion, displays a welcome message in the guest's language of choice on its display screen identifying each guest associated with a medallion 11 that is allowed access to the door, and initiates door unlocking if at least one of the detected medallions is on the white list.

As part of unlocking the door, the access panel 705 activates its ISM radio and establishes a secure communication channel with the ISM radio of the associated door lock module 703. Once the secure communication channel is established and the guest or crew member is determined to be allowed access to the door, the access panel 705 transmits an arming code (e.g., a door unlock authorization signal) to the door lock module 703 across the secure ISM channel. The arming code may be sent as a message that is encrypted, for example using a 128-bit advanced encryption standard (AES). In response to receiving the arming code, the door lock module 703 activates the proximity sensor (e.g., a capacitive proximity sensor) so as to monitor when the guest's (or crew member's) hand contacts or comes into close proximity to the door handle. Upon determining that the guest's (or crew member's) hand contacts or comes into close proximity to the door handle, the door lock module 703 activates the unlocking mechanism (e.g., a solenoid) of the latch assembly 701. If the door is unlocked and opened, the door lock module 703 can communicate that the door has been opened to the access panel 705 and the access panel 705 can, in turn, instruct the medallion 11 to return to the beacon mode of operation.

Optionally, the door lock module 703 can monitor when a person's hand contacts or comes into close proximity to the door handle at all times. In turn, if a door unlock authorization signal has not been received from the access panel 705 and the door lock module 703 determines that a person's hand has contacted or come into close proximity to the door handle, the door lock module 703 may send an unauthorized access attempt signal to the access panel 705. In response to receiving the unauthorized access attempt signal, the access panel 705 activates its camera to capture a picture of the person having attempted to access the door and transmits the picture to a central server 21.

In embodiments in which the medallion 11 is configured to operate in both the bi-directional and the beacon mode of operation, the door unlocking sequence described above can include additional steps. If the medallion 11 is operating in the bi-directional mode of operation, the door unlocking sequence can proceed as described above. Optionally, once the door is determined to be unlocked, the door lock module 703 can communicate that the door has been opened to the access panel 705 and the access panel 705 can, in turn, communicate to the medallion 11 that the medallion can return to the beacon mode of operation.

If the medallion 11 is operating in the beacon mode of operation, the guest engagement system 10 may need to instruct the medallion 11 to switch to the bi-directional mode of operation in order to enable the medallion 11 to establish the secure communication channel with the access panel 705 and provide the access panel 705 with the medallion's unique private identifier. For this purpose, the access panel 705 can, in one example, determine based on the timing of receipt of a beacon signal from the medallion when the next time period during which the medallion will listen for communications from the guest engagement system 10 will occur. In turn, during the determined time period, the access panel 705 transmits to the medallion 11 a communication to cause the medallion to switch to the bi-directional mode of operation. For example, the access panel 705 may transmit a request for the medallion's unique private identifier and, in response to receiving the request, the medallion may switch to the bi-directional mode while continuing to transmit periodic beacon signals.

In another example, the guest engagement system 10 may cause the medallion 11 to switch to the bi-directional mode of operation prior to the medallion 11 reaching the close proximity of the access panel 705 (e.g., prior to being within 2-4 feet of the access panel 705). In the example, location services provided by the guest engagement system 10 monitor the location of each guest within the facility via the guest's medallion 11. Specifically, the network 13 of sensors 15 of the guest engagement system 10 continuously monitors beacon signals received from medallions 11 in each sensor 15 of the network and identifies medallions 11 that are in proximity to each sensor 15 based on the received beacon signals and the public identifiers contained therein. Based on the monitoring of the locations of medallions 11, the guest engagement system 10 can determine whether a recognized medallion is nearing a locked door that is associated with the medallion 11. For example, the system 10 may determine that the medallion 11 has entered a hallway that includes a door to which the guest associated with the medallion has access to, or that the medallion 11 has reached a pre-determined vicinity (e.g., 100 feet or less) from such a door. In response to the determination, the guest engagement system 10 causes one or more sensors 15 that are within communication range of the medallion 11 to transmit a wake command to the medallion 11 to cause the medallion 11 to switch to the bi-directional mode of operation.

In the foregoing example, the guest engagement system 10 may additionally send a wake command to the access panel 705 of the door to which the medallion has access as the medallion 11 nears proximity of the door. In response to the wake command, the access panel can begin monitoring its BLE transceiver for any medallions 11 that are within its read range and are on the authorized user list (e.g., white list) stored by the access panel 705.

The description of the functioning of the automated door lock assembly 700 provided above has focused on BLE-based detection and communications between the access panel 705 and medallion 11. However, both the access panel 705 and medallion 11 are also configured for NFC-based detection and communications, and the access panel 705 also provides functionality for unlocking an associated door based on NFC-based communications. The NFC-based communications can be used, among other use cases, in situations in which a medallion's battery has run out and the medallion is thus unable to emit BLE-based beacon signals or engage in BLE-based communications. To support NFC-based communication, the access panel 705 periodically emits an NFC read signal or NFC interrogation signal that is used to energize any passive NFC-based devices in its vicinity. If a medallion 11 is located in the vicinity of the access panel 705, the NFC read signal will activate the medallion's NFC antenna and transceiver and cause the medallion 11 to provide the access panel 705 with an NFC-based response beacon signal including the public identifier for the medallion 11. Based on the received response signal, the access panel 705 can then establish a secure NFC-based communication channel with the medallion 11 and proceed with door unlocking based on an NFC-based unlocking process analogous to the BLE-based unlocking process described above (with the exception that all communications will be performed using the NFC transceiver rather than the BLE transceiver). The NFC-based unlocking process can also be used using NFC-enabled devices other than medallions, including NFC-enabled access cards for example.

Figure 8A:
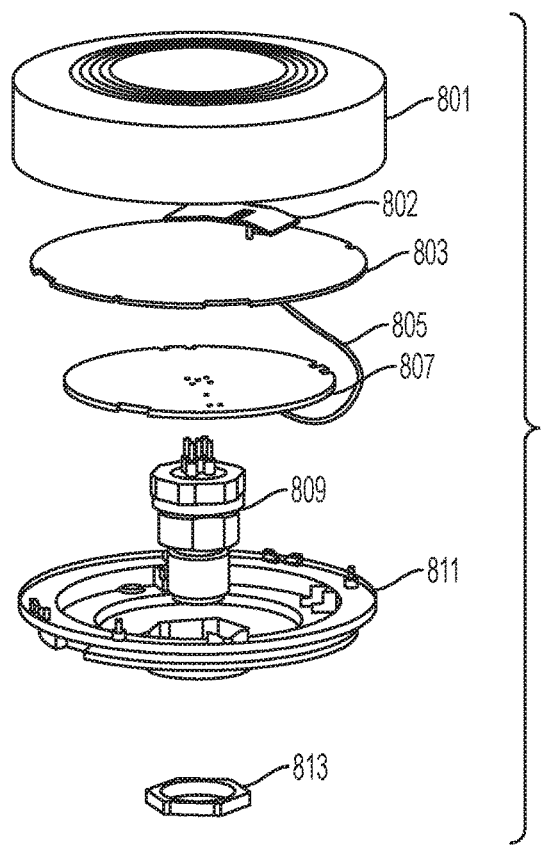
FIGS. 8A-8N are diagrams showing sensors of the guest engagement system and component parts thereof.
Figure 8B:
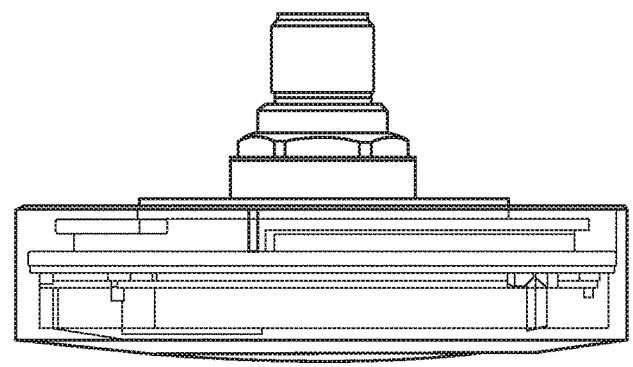
Figure 8C:
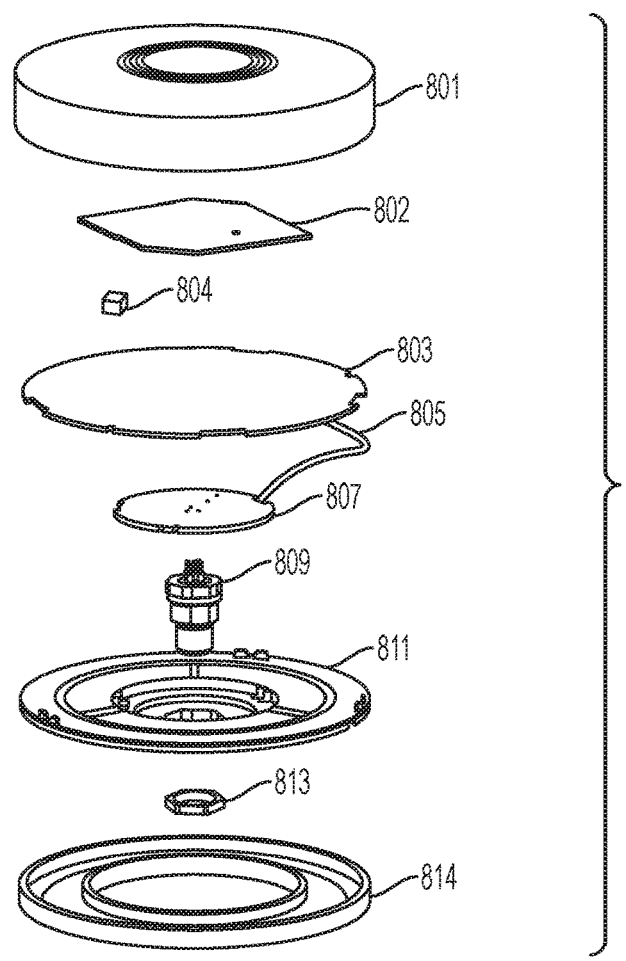
Figure 8D:
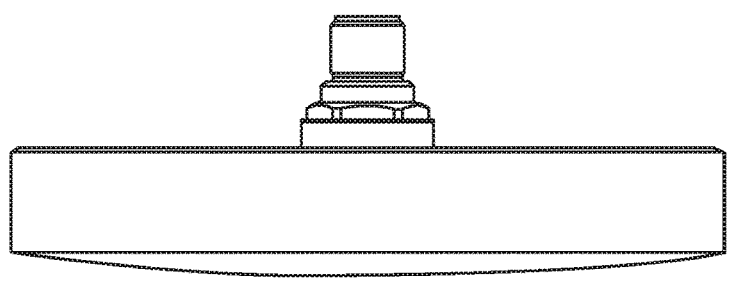
Figure 8F:
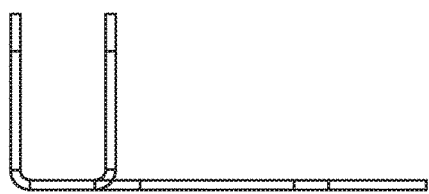
Figure 8H:
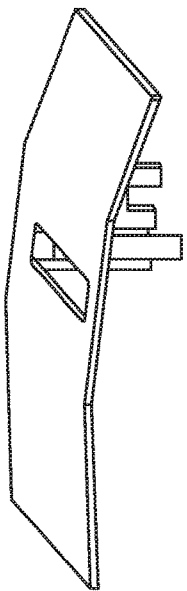
Figure 8E:
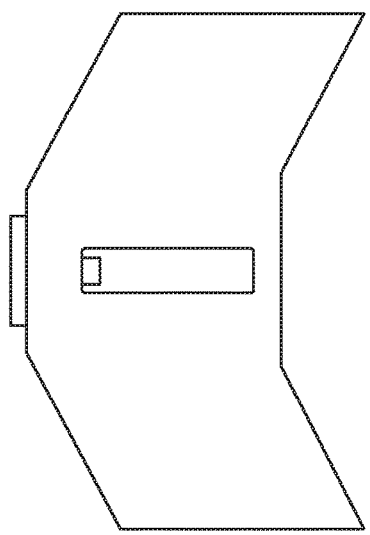
Figure 8G:
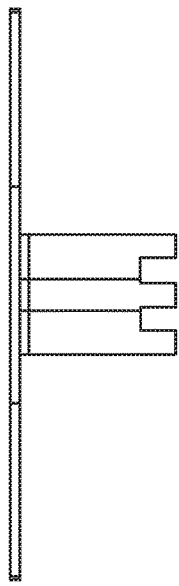
Figure 8L:
Figure 8N:
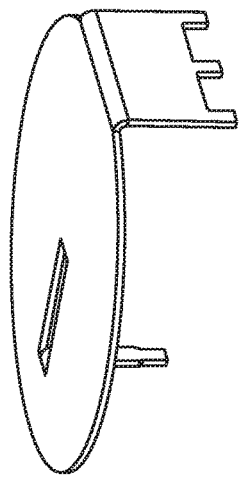
Figure 8K:
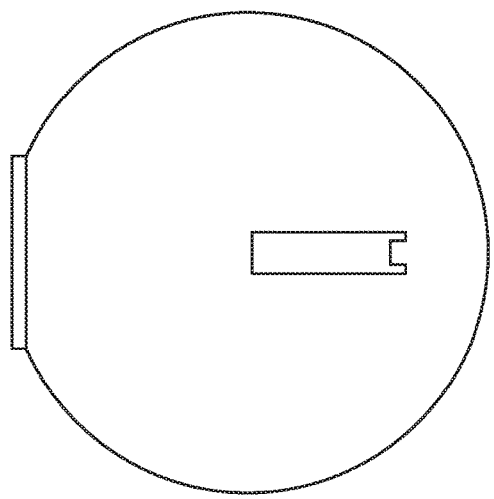
Figure 8M:
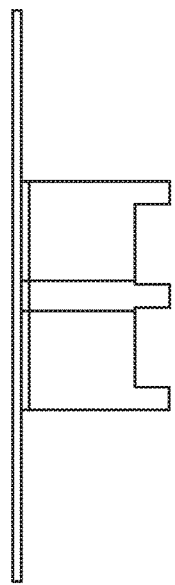

In addition to sensors 15 mounted in interface devices 17, the guest engagement system 10 includes a sensor network 13 of stand-alone sensors 15 disposed throughout the facility (or facilities). Each sensor 15 has a known location, and the sensors 15 in the network 13 are used to track the locations of medallions 11 in the facility by creating a log of each medallion 11 detected by each sensor 15 with an associated timestamp. Further, each sensor 15 can engage in bi-directional communication with medallions 11 within its communication range, including the sensing of medallions 11 through the sensing of beacon and other signals transmitted by the medallions 11 and the transmitting and receiving of signals to and from the medallions 11. Examples of stand-alone sensors 15 are shown and described in FIGS. 8A-8D. Specifically, FIGS. 8A and 8B show views of a directional or omni directional sensor, while FIGS. 8C and 8D show views of a spotlight sensor. The omni directional sensor has a long communication range (e.g., of 30-50 feet, and up to 100 feet or more) extending in all directions around the sensor; the directional sensor has a similarly long communication range (e.g., of 30-50 feet, and up to 100 feet or more) extending in some (but not all) directions around the sensor. The spotlight sensor has a shorter beam-shaped communication range having a diameter that is adjustable and can reach up to 7-10 feet or more, and the beam-shaped typically has a communication range extending in a selected direction from the sensor for a shorter distance than the omni directional sensor (e.g., 15 feet or less). Note that each sensor's communication range can be adjusted downwards from the maximum range values detailed above.

FIG. 8A shows an exploded view of the directional or omni directional sensor that includes an electronics PCB 807 and an antenna PCB 803 mounted between a base plate 811 and a radome 801. The antenna PCB 803 has an antenna element 802 mounted thereon that is communicatively connected to circuitry of the antenna PCB 803. The antenna element 802 has a proprietary shape such as those shown in detail in FIGS. 8E-8H and 8K-8N that confer the directional or omni directional sensitivity to the sensor. The antenna PCB 803 communicates with the electronics PCB 807 through a cable 805, and a connector 809 provides a connection between the electronics PCB 807 and the wired network 19. The sensor 15 can be mounted to or in a ceiling or wall of a facility (e.g., using a connector nut 813), and can be used to monitor and communicate with medallions disposed within the vicinity (e.g., within the communication range) of the sensor. FIG. 8B shows the directional or omni directional sensor when all components are mounted together.

FIG. 8C shows an exploded view of the spotlight sensor that includes an electronics PCB 807 and an antenna mounted between a base plate 811 and a radome 801. A cosmetic base 814 can further be provided. The antenna PCB 803 has an antenna element 802 mounted thereon that is communicatively connected to circuitry of the antenna PCB 803. The antenna element 802 has a proprietary shape shown in detail in FIGS. 8I-8J that confers the spotlight or spotbeam directional sensitivity to the sensor. The antenna includes an antenna PCB 803 having a foam spacer 804 mounted on a surface thereof, and an antenna element 802 mounted on the foam spacer 804. The antenna PCB 803 communicates with the electronics PCB 807 through a cable 805, and a connector 809 provides a connection between the electronics PCB 807 and the wired network 19. The sensor 15 can be mounted to or in a ceiling or wall of a facility (e.g., using a connector nut 813), and can be used to monitor and communicate with medallions disposed within the vicinity (e.g., within the communication range and beam) of the sensor. FIG. 8D shows the spotlight sensor when all components are mounted together.

Detailed views of the antenna elements 802 that can be mounted to the antenna PCBs 803 provided in the sensors 15 such as those shown in FIGS. 8A-8D are provided in relation to FIGS. 8E-8M. FIGS. 8E-8H show detailed views of the antenna element 802 provided in a directional sensor such as that shown in FIGS. 8A and 8B. The antenna element 802 may be designed for wall or ceiling mounting locations within a facility and may provide a directional sensing capability having a broad beam width for procuring linear polarized radiation direction to the front face of the antenna. As shown in the top and side views shown in FIGS. 8E-8G, the antenna element 802 has an inverted-V shape that is generally symmetric about a center line, and includes two tabs extending downwardly from a main surface of the antenna that are used for mounting to the antenna PCB 803. The main surface of the antenna, shown in FIG. 8E, including a rectangular central portion having symmetrical parallelogram-shaped extensions extending from opposing sides of the rectangular central portion. Illustrative dimensions of the antenna element 802, measured in inches, are provided in the figures. The dimensions provided are illustrative, and the antenna element 802 can be scaled up or scaled down relative to the dimensions shown depending on the particular application the antenna element 802 (and associated sensor 15) is designed for. In particular, the dimensions can be selected and adjusted in order to vary the center frequency and impedance matching of the antenna. For example, the dimensions provided may be selected to provide the antenna element 802 with a resonating operating frequency of 2.4 GHz (within the BLE operation range in the ISM band) when corresponding PCB ground spacing and housing dielectric proximity are accounted for. The lower tabs extended downwardly from the main surface of the antenna serve as a feed tap and a ground tap electrically connected to the PCB 803, and also serve to maintain the antenna element 802 at an appropriate height spacing from the PCB ground plane.

FIGS. 8I-8J show detailed views of the antenna element 802 provided in a spotlight (or spotbeam) sensor such as that shown in FIGS. 8C and 8D. The antenna element 802 may be designed for ceiling mounting locations (or wall mount locations at high elevation with down tilt) within a facility and may provide high gain and a directional narrow-beam (i.e., spotlight) sensing capability procuring circularly polarized (CP) radiation. As shown in the top and side views shown in FIGS. 8I-8J, the antenna element 802 has a generally planar shape, and has a shape of a square having diagonally opposite corners removed at angles of 45 degrees relative to sides of the square. The antenna element 802 of FIGS. 8I and 8J may be mounted to the antenna PCB 803 via a foam spacer 804, as shown in FIG. 8C. Illustrative dimensions of the antenna element 802, measured in millimeters (mm), are provided in the figures. The dimensions provided are illustrative, and the antenna element 802 can be scaled up or scaled down relative to the dimensions shown depending on the particular application the antenna element 802 (and associated sensor 15) is designed for. In particular, the dimensions can be selected and adjusted in order to vary the center frequency, axial ratio, and impedance matching of the antenna. For example, the dimensions provided may be selected to provide the antenna element 802 with a resonating operating frequency of 2.4 GHz (within the BLE operation range in the ISM band) when corresponding PCB ground spacing and housing dielectric proximity are accounted for.

FIGS. 8K-8N show detailed views of the antenna element 802 provided in a circular sensor. For example, the antenna element shown in FIGS. 8K-8N may provide omni-directional sensing, and may be used within a sensor 15 such as that shown in FIGS. 8A and 8B. The antenna element 802 may be designed for ceiling mounting locations within a facility and provide a linear polarized broad beam width for procuring an azimuth omni-directional sensing pattern. As shown in the top and side views shown in FIGS. 8K-8M, the antenna element 802 has a generally symmetric shape about a center line, and includes two tabs extending downwardly from a main surface of the antenna that are used for mounting to the antenna PCB 803 (as shown, e.g., in FIG. 8A). The main surface of the antenna shown in FIG. 8K has a generally circular shape. Illustrative dimensions of the antenna element 802, measured in inches, are provided in the figures. The dimensions provided are illustrative, and the antenna element 802 can be scaled up or scaled down relative to the dimensions shown depending on the particular application the antenna element 802 (and associated sensor 15) is designed for. In particular, the dimensions can be selected and adjusted in order to vary the center frequency and impedance matching of the antenna. For example, the dimensions provided may be selected to provide the antenna element 802 with a resonating operating frequency of 2.4 GHz (within the BLE operation range in the ISM band) when corresponding PCB ground spacing and housing dielectric proximity are accounted for. The lower tabs extended downwardly from the main surface of the antenna serve as a feed tap and a ground tap electrically connected to the PCB 803, and also serve to maintain the antenna element 802 at an appropriate height spacing from the PCB ground plane. The feed and ground taps can provide for different current flow directions on the surface of the antenna radiation element 802.

In general, the sensors 15 mounted in interface devices 17 of the guest engagement system 10, such as the antennas of access panels 705 used to unlock doors, are adjusted to have limited range (e.g., 2-4 feet) so as to only sense medallions 11 of guests that are in close proximity to the interface devices 17. Additionally, the sensors 15 of interface devices 17 can be directional or spotlight type sensors operative to detect medallions 11 in only selected directions. In this way, a sensor associated with an access panel 705 may be operative to only detect medallions 11 that are disposed within a limited distance in any direction from the sensor, while a sensor of a payment terminal or vending machine may only detect medallions 11 that are disposed within a limited angular range (e.g., directly in front of the payment terminal or vending machine) and within a limited distance (e.g., less than 2 feet) from the sensor.

As noted above, the sensors 15 are disposed throughout the facility, and are used to monitor the locations of medallions 11 throughout the facility and provide services to guests based on the sensed signals. Specifically, the sensors 15 are used by the guest engagement system 10 to provide location information to the guest engagement system 10 at selectable levels of precision. At a low level of precision, the location of a medallion 11 is identified based on the identity (ies) of the one or more sensors 15 or other devices that detect beacon signals from the medallion 11 at any given time. In this way, the position of the medallion at any time can be approximated based on the known positions of the sensor(s) (and/or positions of other devices, if known) having detected the medallion's most recently detected beacon signal(s). In order to determine the position of a medallion 11 at a higher level of granularity, the position of the medallion is determined based on the relative received signal strength of the beacon signal measured at each of the sensor(s) having received the beacon signal, and/or based on characteristics of the sensing range and sensing beam (e.g., sensing range and sensing direction) of the sensor(s). In particular, when beacon signals from a medallion 11 are received by three or more sensors 15, the relative received signal strength of the beacon signal at each of the sensors 15 (and/or the delay between reception times of the beacon signal at each of the sensors 15) can be used to triangulate the position of the medallion 11 relative to the known locations of each of the sensors 15.

The monitoring of the locations of medallions 11 within the facility can be performed not only by sensors 15 of the sensor network 13 but also by sensors 15 mounted in interface devices 17 of the guest engagement system 10. For example, the access panels 705 of automated door lock assemblies 700 located throughout the facility can be used to detect all medallions 11 passing by the access panels 705. The access panels 705 can relay the identity of all detected medallions 11 to a central location server which maintains a log of all medallions' locations with associated timestamps. Additionally, the monitoring of locations can be performed through sensing of medallions 11 by BLE- or NFC-enabled devices, such as BLE- or NFC-enabled mobile devices, tablet computers, or interactive displays that are in communication with servers 21 of the guest engagement system 10. The BLE- or NFC-enabled mobile devices, such as guests' mobile devices or staff members' tablets, may detect medallions 11 located within the devices' communication ranges and report to the central location server the identities of detected medallions 11 along with timestamps of detection and location information for the device (if available).

In order to provide continuous real-time monitoring of the locations of medallions 11, each of the sensors and devices that detect medallions 11 relay the identity of all detected medallions 11 along the time-of-detection timestamps to a same central location server. The central location server thus maintains a log of all medallions' locations with the associated timestamps. The central location server can thus be used to identify each medallion's most recent detected location based on the most recent log entry for the medallion 11 or, if appropriate, based on two or more of the most recent entries in the log for the medallion 11 (e.g., to provide increased location accuracy by combining two different location sensing methodologies). In this way, the guest engagement system 10 provides real-time (or near real-time) evaluations of each medallion's location. The location information can further be used by the guest engagement system 10 to provide additional services to guests or others, for example to provide notification events to systems that are used to activate personalized interactions when a medallion 11 is determined to arrive in an area, move around an area, linger in an area for a determined amount of time, or exiting an area or space equipped with sensors 15.

The location-based services can further be enhanced through the use of sensors 15 located near points of entry and/or exit from a facility. Specifically, if the last entry relating to a particular medallion 11 in the log maintained by the central location server is for an entry/exit location—and the log does not include any further detections of the medallion 11 at later times in the facility—the system may determine that the medallion 11 (and its associated guest) have exited the facility. In turn, when the medallion 11 is once again detected at the same (or a different) entry/exit location, the medallion may be determined to have re-entered the facility. The guest engagement system 10 may thereby maintain a log of medallions 11 that are in the facility and a log of medallions 11 that have exited the facility. Notification can be provided to users based on these logs, for example to inform another guest that their family member has exited the facility and/or returned to the facility.

In addition to the functions described above, the guest engagement system 10 can additionally be used for maritime mustering, emergency evacuations, or the like. Specifically, since the guest engagement system 10 includes sensors 15 throughout the facility (or ship) that are configured to monitor the positions of medallions 11, the guest engagement system 10 maintains current up-to-date information on guests' locations within the facility at all times based on the monitored locations of all guests' medallions 11. Based on the current information on guests' locations, the guest engagement system 10 can dynamically assign guests to mustering stations or evacuations routes when a mustering or evacuation operation is undertaken. Specifically, the guest engagement system 10 can dynamically assign guests to mustering stations or evacuations routes in such a way as to assign guests to the mustering station or evacuation route that is closest to their current position when the mustering or evacuation operation is triggered. The guest engagement system 10 can additionally or alternatively dynamically assign guests to mustering stations or evacuation routes so as to avoid overloading a particular mustering station or evacuation route when the mustering or evacuation operation is triggered. For example, in situations in which a large number of guests are concentrated within a certain portion of the facility (e.g., a large number of guests are in or near the stern of the ship), the dynamic assignment may be used to assign certain guests to mustering stations or evacuation routes in or near the bow of the ship to ensure that no mustering station or evacuation route is overloaded with guests. Additionally, the guest engagement system 10 can monitor the position of medallions and guests during the mustering or evacuation operation, and dynamically change a particular guest's assigned mustering station or evacuation route based on updated real-time information obtained based on the real-time monitoring of guests' changes in location (i.e., movement) through the facility. In this manner, a guest's assigned mustering station or evacuation route can be updated if the guest follows an unexpected route during the mustering or evacuation operation, for example if the guest follows an unexpected route to retrieve a child during the mustering or evacuation operation or if the guest must divert around a smoke-filled corridor during the evacuation.

The guest engagement system 10 can further be used to automatically identify rooms that are cleared of all guests during the mustering or evacuation operation, for example by determining that no medallions are present in the room and/or determining that all guests associated with the room are located elsewhere in the facility (based on the monitored locations of the guests' medallions). Conversely, the guest engagement system 10 can be used to automatically identify rooms that have guests present therein during the mustering or evacuation operation (based on the monitored locations of the guests' medallions), and to direct crew and/or emergency responders to the identified rooms to assist guests in the evacuation.

The above-identified features of the guest engagement system 10 used in mustering and/or evacuations are enabled, in part, by the guest engagement system's ability to communicate information to guests during the mustering or evacuation operation. For this purpose, the guest engagement system 10 relies on the access panels 705, interactive displays 17c, portals 17d, and the like that are located throughout the facility. Specifically, the guest engagement system 10 provides mustering and/or evacuation instructions on the displays of interface devices 17, such as arrows (or more detailed instructions) pointing towards mustering stations and evacuation routes. The instructions can additionally be customized to the individual guests whose medallions are detected in the vicinity of each interface device 17, for example to instruct one guest to evacuate in a particular direction while instructing a different guest to evacuate in another direction (e.g., to enable the other guest to regroup with other guests in his/her party). The instructions can also provide information to guests regarding other guests in a same party, for example to provide a guest with information on the current location, assigned mustering location, and/or assigned evacuation route of the guest's child, spouse, or friend. The instructions can also be customized for each guest to display in the guest's language of choice.

Figure 9:
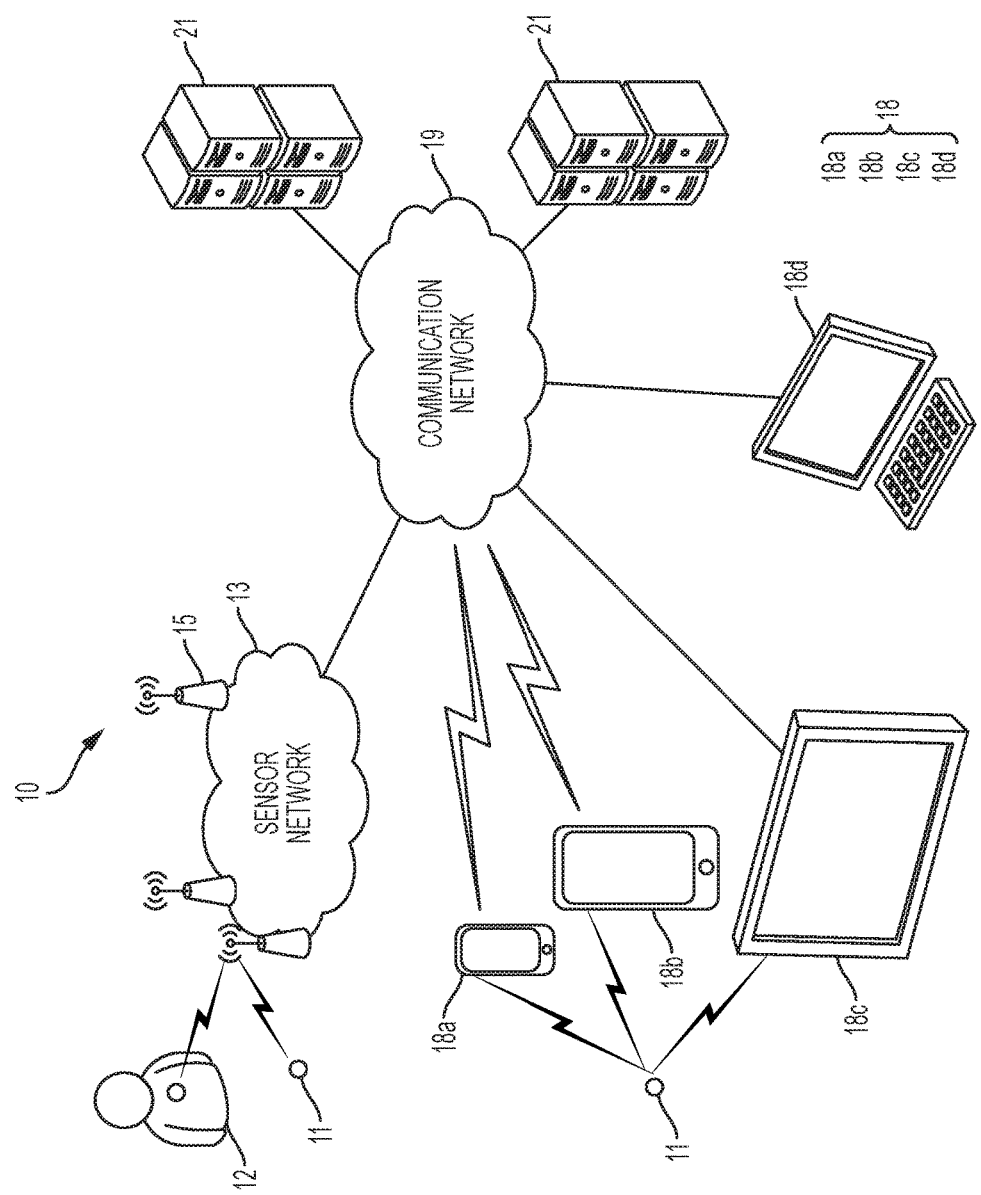
FIG. 9 is a high-level functional block diagram showing additional components, including end devices, of a guest engagement system.

The guest engagement system 10 provides services and engagement with guests through a variety of different modalities and terminals. For example, as shown in FIG. 9, the guest engagement system 10 can provide services and engagement through end devices 18 such as mobile devices 18a (e.g., smartphones), tablet computers 18b, interactive displays 18c (e.g., touch-enabled display screens), web-enabled televisions (e.g., stateroom televisions), desktop computers 18d and/or web interfaces, kiosks, among others. In general, an end device 18 includes a processor, memory storing program instructions, a display, and a user input interface such as a touch-screen, although additional components (or fewer components) may be used. Some end devices 18, including interactive displays 18c, web-enabled televisions, kiosks, and the like, may also function as interface devices 17, and vice versa. In particular, end devices 18 that are BLE-enabled (e.g., include a BLE transceiver) can generally function as interface devices 17. Conversely, interface devices 17 that include a user input interface and provide access to the guest engagement application described in more detail below can function as end devices 18.

The services and engagement provided by the guest engagement system 10 may be provided through an application or other executable program stored on and executed by the end devices 18 such as a dedicated guest engagement application. The services and engagement may alternatively or additionally be provided through web-based interfaces, such as a guest engagement interface executed on a server 21 accessed through a web browser executed by an end device 18 and having a communication connection to the server 21. The services and engagement generally rely at least in part on data and information retrieved from the servers 21 of the guest engagement system 10 via network connections (e.g., Internet connections) of the end devices 18, although certain services and engagement can be provided without network connections or without retrieving data and information from the servers 21. For purposes of communicating with the servers 21, the end devices 18 are shown in FIG. 9 as having wireless (e.g., in the case of end devices 18a and 18b) or wired (e.g., in the case of end devices 18c and 18d) connections to the servers 21 through the communication network 19. Note that communication network 19 can include one or more of a local area network (LAN), a wide area network (WAN), the Internet, and the like.

As shown in FIG. 9, some of the end devices 18 through which services and engagement are provided may be BLE-enabled devices, such as BLE-enabled mobile devices 18a, tablet computers 18b, or interactive displays 18c. When such an end device 18 executes the guest engagement application, the guest engagement application may optionally activate the BLE transceiver of the end device 18 to provide additional services to a user. For example, the guest engagement application may activate the BLE transceiver of the end device 18 and use the activated BLE transceiver to listen for beacon signals emitted by medallions 11 located within a BLE communication range of the end device 18. The guest engagement application may optionally report to the servers 21 the identifiers of medallions 11 from which beacon signals were received along with a timestamp of receipt and location information for the end device 18 (when available). The guest engagement application may further use the activated BLE transceiver to engage in two-way communication with medallions 11 from which beacon signals were received. In one example, the guest engagement application may cause the mode of operation of a medallion 11 to change. In one use case, the guest engagement application may cause the BLE transceiver of the end device 18 to emit an advertisement from the guest engagement system, so as to cause any medallion 11 in its communication range to exit the sleep mode when the medallion 11 detects the advertisement. In another use case, the guest engagement application may cause a medallion 11 operating in the beacon mode to enter the bi-directional mode or the sleep mode of operation, or cause a medallion 11 operating in the bi-directional mode to enter the beacon mode or the sleep mode of operation.

In some instances, the guest engagement application may additionally or alternatively activate the NFC transceiver of an end device 18 when the application is executed on an NFC-enabled end device 18. In such situations, the application can be used to detect medallions 11 and engage in communication with medallions 11 via NFC. In particular, while the description herein is focused on BLE-based communications between end devices 18 and medallions 11, the features described in the BLE-based context can similarly be enabled through NFC-based communication between the end device 18 and medallions 11 when using an NFC-enabled end device 18.

References to the guest engagement application throughout this document refer not only to instances in which the guest engagement application takes the form of an application or other executable program stored on and executed by an end device 18 but also refer to instances in which the guest engagement application takes the form of a web-based interface or other terminal-based interface. In general, user interfaces provided through application-based and web-based interfaces will be similar, although certain functionalities of the guest engagement application may only be offered on application-based or on web-based interfaces. Additionally, references to the guest engagement application may refer to different versions of the application, including guest-focused versions that include only functionalities offered to guests, staff-focused versions that include additional functionalities offered to hosts or staff, supervisor-focused versions that include functionalities offered to supervisors overseeing staff members, and administrator versions that include functionalities offered to system administrators only.

In order to use the guest engagement application through an end device 18, a guest generally needs to identify and authenticate themselves. If not identified and authenticated, the guest may only have access to limited features of the application and the guest may notably not have access to user profile-based information. In instances in which the guest engagement application runs on a BLE-enabled end device 18, the guest engagement application can listen for BLE beacon signals from guests' medallions 11 and, in response to detecting one or more beacon signals, can provide a log-on page personalized for the guest(s) that are automatically identified based on the detected beacon signals. Guests can then authenticate themselves to log into the application by entering a password or personal identification number (PIN) into the application. If the application runs on an end device 18 that is not BLE-enabled, and/or if a guest's medallion beacon signal is not detected by the application, a guest can identify and authenticate themself to log into the application by entering both a username and a password or personal identification number (PIN) into the application. Note that when the application runs on a guest's own mobile device 18a, the guest can select to remain logged into the application in order not to have to enter a password or PIN each time the guest accesses the application. Otherwise, the guest may be automatically logged out of the application if no user interaction occurs for a pre-determined length of time. Additionally, in cases in which log-on was based on detecting a medallion beacon signal, the guest may be automatically logged out if the medallion beacon signal is no longer detected by the application or end device 18 for a pre-determined length of time or if the medallion 11 is determined to have stepped away from the end device 18.

Once logged in, the application may automatically access and securely retrieve profile information associated with the identified and authenticated guest from the servers 21. The application can also be used to prompt a guest to provide, complete, or review missing profile information that is then uploaded from the application to the servers 21. Profile information may include a name, identity photograph, booking and other reservation information, payment information (e.g., information on stored payment modalities for the guest), and the like. The profile information can also include additional data associated with the guest, including information on the guest's past, present, and future activities (determined based on bookings and reservations and on location data), past, present, and future locations (determined based on bookings and reservations and on location data), past, present, and scheduled future orders and preferences, and the like. The profile information can also include pictures, music, video, and other types of data associated with the guest.

Through guest-focused versions of the application, the guest engagement system 10 provides a variety of services to guests. For example, a guest using of the application can use the application to review the guest's bookings, registration, and reservations, including past, present, and future registrations for lodging, restaurants, shows, activities, and the like. The guest can also use the application to receive information on and make reservations for available lodging, restaurants, shows, activities, and the like. The information may be based on recommendations for future bookings, registrations, and reservations personalized for the guest based on the guest's profile information. The guest can also use the application to review photographs, videos, and other media items make available by the guest engagement system 10, including photographs, videos, and other media items that are associated with the guest. The association of media items with the guest can be based on matching guest profile information with tagged information for the media items, such as profile and tag information indicating that a video was taken at a location visited by the guest's medallion, profile and tag information indicating that a photograph includes a person associated with the guest based on the person's medallion having been detected in proximity to the photographer at the time the photograph was taken, or the like. The application may also provide access to games (optionally including wager-based games), shopping, and other functionalities.

The guest engagement system 10 may also allow guests to view live shows using the guest-focused version of the application. The show can be viewed, for example, through the guest's stateroom television on which the guest engagement application can be accessed. In detail, the guest using the guest engagement application may select to view a live show through the application, such as a show occurring in a theater or other venue within the facility in which the guest engagement system 10 is installed or outside of the facility. In response to the selection, the guest is presented with a live audio and/or video stream of the event. Additionally, the application allows the guest to interface with a performer participating in the live show. In detail, the application can allow the guest to send instant messages or other feedback to the performer for example by typing a message for the performer on an user input interface of the application (e.g., an on-screen keyboard or a remote control for a stateroom television) or selecting a feedback button (e.g., a "clap" button, a "laugh" button, a "thumbs-up" button, a "heart" button, or the like). The instant messages and feedback are then displayed on a screen provided in front of the performer and/or provided as auditory feedback to the performer (e.g., by activating pre-recorded clapping or laughing sounds) so as to notify the performer of feedback received from the guest and enable the performer to engage with the guest during the show.

In some examples, the guest engagement application provides communication functionalities to enable users of the application (including both guests and staff) to communicate with each other using the application. The communication functionalities can include text, audio, and/or video-based communications between users such as chat-based communications, instant messaging (IM), voice-mail or video voice-mail, and the like. In addition, the communications functionalities can allow users to obtain information on other linked users including position information. Linked users can include, in the case of a guest, other guests in his/her party (e.g., other guests that are part of a same reservation, such as children, parents, or the like) or guests who have accepted link request to the guest, or in the case of a staff member, one or more persons for whom the staff member is to provide a service (e.g., a guest having ordered food or drink to be delivered by the staff member). For example, once users are linked, the communication functionality of the guest engagement application may provide general location information to a guest (e.g., to indicate that another guest is in the facility or has exited the facility) and/or precise location information (e.g., to indicate that the other guest is in their stateroom). The communication functionality may also indicate whether another linked guest is available for instant communication and, in some examples, may identify guests having left the facility as being unavailable for communication.

The guest engagement system 10 provides additional functionality through staff-focused versions of the guest engagement application. The staff-focused versions of the guest engagement application can be executed on end devices 18 used by hosts and staff to provide services and engagement to guests of the facility. Commonly, hosts and staff will access the staff-focused version of the guest engagement application on a tablet computer 18b end device that is BLE-enabled (e.g., the end device includes a BLE transceiver and BLE antenna), although in some situations hosts and staff will access the application through other end devices (e.g., interactive displays 18c, portals, access panels 705 of door locks, and the like).

In one example, the staff-focused version of the guest engagement application can be used by a staff member to engage with guests. For this purpose, the guest engagement application uses the BLE transceiver of the end device 18 to detect any medallions 11 within the vicinity (e.g., BLE communication range) of the end device 18. Specifically, the BLE transceiver is used to detect beacon signals emitted by medallions 11 within the vicinity of the end device 18. When one or more beacon signals is/are detected, the staff-focused version of the guest engagement application is configured to retrieve the public identifier of each medallion that is included in the emitted beacon signals, and to retrieve from the servers 21 profile information associated with the retrieved identifier(s) and associated guest(s). The retrieved profile information generally includes a photograph and name (or nick-name) associated with the guest. The retrieved profile information is then provided on a display of the end device 18 to enable the staff member or host to engage with the guest(s) based on the retrieved profile information. For example, based on the retrieved profile information, the staff member can visually identify the guest, greet the guest by name or nick-name, and discuss the guest's upcoming bookings with the guest.

In situations in which profile information for multiple guests is received by the end device 18, the guest engagement application may display profile information for the multiple guests. In some examples, the profiles may be displayed in an order of estimated distance of each guest from the end device 18, where the estimated distance can be determined based on a signal strength or transmission delay associated with the respective BLE beacon signal associated with each guest's medallion 11 and detected by the end device 18.

Based on the retrieved profile information, the staff member or host can assist the guest. For example, the staff member or host can review the guest's bookings, registration, and reservations; provide information and/or make recommendations or reservations for future bookings, registration, and reservations personalized for the guest based on the guest's profile information; place orders for drinks and food for delivery to the guest; assist the guest in finding their way through the facility; or the like. The application may also enable the staff member or host to engage in games (optionally including wager-based games) with the guest, and provide further functionalities.

The guest engagement system 10 can further provide payment functionality through the staff-focused version of the application. As described above, medallions 11 can be used for payments by establishing a secure communication channel between the medallion 11 and a payment terminal (e.g., 17b), authenticating the identity of the medallion 11 across the secure communication channel using the medallion's unique private identifier or other encrypted information stored in the medallion 11 and, based on the authenticated identity, processing a payment transaction using payment information associated with the authenticated medallion 11. Such payment transactions can be performed over BLE or NFC communications between the medallion 11 and payment terminal (e.g., 17b), and can be performed by vending machines, cash registers, and other payment terminals in which a staff member or cashier need not be present. In addition, a streamlined payment process can be used through the staff-focused version of the application. Specifically, through the staff-focused version of the application, a staff member can perform authentication of the guest through visual recognition of the guest based on comparing the guest's appearance with the photograph stored in the guest's profile. In particular, the guest engagement system 10 may prompt a staff member using the staff-focused version of the application to authorize a payment to a guest account. The prompt may be presented in response to the staff member selecting through the application to place an order on behalf of the guest (e.g., an order for food or drink, a registration for an excursion, a booking for seats at a show, a room upgrade, a payment to participate in a game, or the like), for example. The prompt may generally rely on two complementary identification modalities in order to allow the staff to authorize the payment, although different numbers of identification modalities (including a single identification modality) may be used. For example, the prompt may rely on the end device 18 that executes the staff-focused version of the application detecting the medallion 11 of the guest to whom payment is to be charged (e.g., using BLE and NFC communication modalities to detect the medallion 11), retrieving profile information (including a photograph) for the detected medallion 11 from the server 21, displaying the photograph of the guest associated with the medallion 11, prompting the staff member to visually confirm that the guest with whom the staff member is interacting matches the displayed photograph and, upon receiving confirmation from the staff member that the guest matches the photograph, processing the payment. In the example, the two complementary identification modalities used are detection of a medallion 11 and visual confirmation of a guest's identity, although other modalities (and different numbers and combinations thereof) can be used in other examples.

The guest engagement system 10 also provides wayfinding functionality, and provides an interface for wayfinding through the guest engagement application. The wayfinding functionality provided by the guest engagement system 10 can be used for wayfinding within a moving reference frame as well as within a fixed reference frame. For example, in the case of wayfinding on a cruise ship, traditional location determination systems such as GPS cannot readily be used for multiple reasons. First, the cruise ship can move, and wayfinding within the ship must therefore be based on the moving reference frame of the ship rather than a fixed (e.g., land-based) reference frame. As a result, GPS-based location determination and other fixed-reference frame location determinations are of limited use since a user's GPS-based location cannot be used to determine where the user is located relative to the moving ship. Second, the cruise ship includes substantial masses of metal and other surfaces which interfere with the propagation of GPS-based signals (such that GPS signals cannot be received inside the ship) and/or cause substantial signal noise as a result of electromagnetic signals bouncing off of metallic surfaces. As a result, traditional location determination systems are generally not effective for wayfinding on a ship.

In order to address the shortcomings noted above, the guest engagement system 10 provides its own wayfinding functionality based on the network of sensors 13 of the guest engagement system 10. In detail, the guest engagement system 10 maintains a database of locations at which medallions 11 have been detected. Each record in the database includes an identifier for the medallion (e.g., the public identifier for a medallion 11 that is broadcast as part of the device's beacon signal), an identifier for a location (e.g., identifier(s) of the location(s) of the sensor(s) 15 or other antenna or device having detected the beacon signal, and/or a more precise location determination based on triangulation, multilateration, or other location-determining method), and a timestamp. The location determination performed by the guest engagement system 10 can thus be performed based on sensors of the sensor network 13 as well as based on beacon signals detected by end devices 18, by interface devices 17, and the like. As noted previously, the location determination may be performed at different levels of precision depending on the types of sensors 15 through which beacon signals have been detected (e.g., spotlight sensors provide more detailed location information than omni-directional sensors), depending on the number of sensors 15 having detected the beacon signals, depending on whether triangulation, multilateration, transmission delay, or signal strength information from multiple sensors is used, and the like.

The wayfinding functionality provided by the guest engagement system 10, including the wayfinding provided through the guest engagement application, is thus provided based on location determination performed by the guest engagement system 10. Specifically, a guests' location is determined by a server 21 of the guest engagement system 10 by determining a location of the user's medallion 11 and reporting the determined location to the guest through the guest engagement application. For example, the guest location may be displayed superimposed on a map or on a three-dimensional model of the ship shown on a user interface of the application provided on the end device 18 currently in use by the guest. In this way, the guest's position is not generally determined by the end device 18 in use by the guest, but the guest's position is instead generally determined by the guest engagement system 10 (e.g., by a server 21 of the guest engagement system 10) based on a location of the guest's medallion 11 as detected by the sensor network 13 of the guest engagement system 10.

Note that as described above, the sensor network 13 of the guest engagement system 10 can extend to multiple different facilities including facilities located on and facilities located off of a ship. The guest engagement system 10 can thus be used to provide accurate location determination and wayfinding in any of the facilities, including fixed facilities (e.g., land-based), moving facilities (e.g., ship-based), and facilities including both fixed and moving components (e.g., facilities accessed by cruise passengers during a cruise, which may include both ship-based and land-based facilities). In such cases, the guest engagement system 10 can automatically determine a guest's position accordingly to the appropriate fixed or moving reference frame depending on whether the guest is currently positioned on a fixed (e.g., land-based) or moving (e.g., ship-based) reference frame, and provide location information through the guest engagement application in the reference frame determined to correspond to the guest's current position.

As detailed above, the guest engagement system 10 can determine the position/location of a guest based on the medallion 11, and more particularly based on the locations at which beacon signals emitted by the medallion 11 are detected. The detection relies on operation of the sensors 15 of the system 10, and more specifically on the known location at which each sensor 15 is installed and the sensing range of each sensor (e.g., shape and orientation of a directional sensing range). The detection can also rely on detection of beacon signals by end devices 18 including end devices 18 that have variable locations such as mobile devices 18a and tablet computers 18b. In detail, in the case of end devices 18, the locations of end devices 18 having fixed locations can be stored by servers 21 of the guest engagement system 10 and the stored location information can be used to determine the locations of detected medallions 11.

In the case of movable end devices 18, the guest engagement system 10 can rely on two sources of information to determine a current location of an end device 18 and thereby infer locations of medallions 11 detected by the end device 18. First, the guest engagement system 10 can receive periodic reports from end devices 18 including identifiers of medallions 11 from which beacon signals were detected, and can infer the location of a medallion 11 by determining the location of the end device 18 from which the report was received. The guest engagement system 10 can then determine the location of the end device 18 based on the identity of a Wi-Fi or other wireless access point through which the end device 18 is connected to the communication network 19 of the system 10. For this purpose, the guest engagement system 10 maintains a database identifying the mounting location of each wireless access point in the facility, and uses the database to identify the location of end devices 18 and medallions 11 detected by the end devices 18. The identity of the wireless access point can be reported to the guest engagement system 10 by the end device 18, or determined by the guest engagement system 10 based on header information included in packets received from the end device 18.

Second, as part of the periodic reports received from end devices 18 and identifying medallions 11 detected by the end devices, the guest engagement system 10 may receive location information of the end devices 18 when such information is available. The location information reported by the end device 18 may be a location determined by the end device 18 based on the end device's own position determination function such as a GPS-based position determination. In such situations, the guest engagement system 10 can use the reported location information provided by the end device 18 to determine the location of medallions 11 detected by the end device 18. The guest engagement system 10 can further use information on location of the moving reference frame (e.g., a GPS location of the ship on which the end device 18 is travelling) to determine the position of the end device 18 relative to the moving reference frame.

The wayfinding functionality can be used by the guest engagement system 10 in order to enable a user of the guest engagement application to locate another guest or staff member by tracking the other guest or staff member in real time. This guest tracking functionality can be used by a guest to locate another guest (e.g., a friend, spouse, child, . . . ) as well as by a staff member or host to locate a guest (e.g., to deliver a food, beverage, or other order, or to assist the guest in another manner), among other circumstances. The guest tracking functionality enables one user of the application to be provided through the guest engagement application with information on the other guest's current location as determined by the guest engagement system 10, including a display of the other guest's current location displayed superimposed on a map or on a three-dimensional model of the ship (or other facility) shown on a user interface of the application. The guest tracking functionality also enables the one user to be provided with wayfinding directions to the other guest's current location based on a combination of the user's location (determined by the guest engagement system 10 based on the detected location of the user's medallion 11) and the other guest's location (determined by the guest engagement system 10 based on the detected location of the other guest's medallion 11). The locations may be updated in real-time as the user and guest move about the facility, and the wayfinding directions may correspondingly be updated in real-time.

The functionalities of the guest engagement system 10 described above can enable the following services to be provided (described in the illustrative context of a cruise ship example).

The guest engagement system 10, through the guest engagement application, enables guests to engage with the system from outside of the facility in which the system is installed. For example, guests can engage from home by accessing their profile through a web-based version of the application or through an end device 18 (e.g., mobile phone 18a, tablet computer 18b, desktop computer 18d, or the like) running the application. Guests can then, at their leisure, populate their guest profile by inputting any required documentation such as passport information, completing health forms and travel details, and inputting a preferred form of payment. The guests can also upload a photo, create a digital avatar to further personalize their profile, and arrange or book services for example to have luggage picked up for expedited delivery direct to their stateroom.

Guests can further engage when in an airport—notably in cases in which guests have obtained their medallions 11 in advance of travel. For example, in the case of guests travelling to a facility in which a guest engagement system 10 is operative, the guests may be met at the destination airport by staff members. In the example, staff members stationed at the airport may be equipped with end devices 18 running the guest engagement application. The staff members may use the end devices 18 and the application to detect medallions 11 of arriving guests, retrieve profile information for the guests including photographs, and recognize the guests based on the proximity of the medallions 11 and visual recognition of the guests based on the photographs. The staff members can thus personally welcome the guests, confirm their documentation status, and direct them through the airport (e.g., to direct the guests to a fleet of motor coach vehicles destined for a port terminal).

In transit in the motor coach vehicles, guests can again access the guest-focused application through their end devices 18 (e.g., mobile phones 18a or tablet computers 18b) to explore options provided at the destination facility (e.g., the cruise ship, in one example), book activities and learn more about the people, places and cultures they will come to experience.

Additionally, once at the cruise terminal (e.g., in the cruise ship example), guests may be able to board the ship with minimal further interaction with staff members since the guests are already equipped with their medallions 11 which function as the key to their stateroom. Additionally, staff members in the terminal may use end devices 18 running the staff-focused application to identify arriving guests, identify guests who haven't yet completed the registration process, and approach those guests in order to assist them with finalizing the process.

Figure 10:
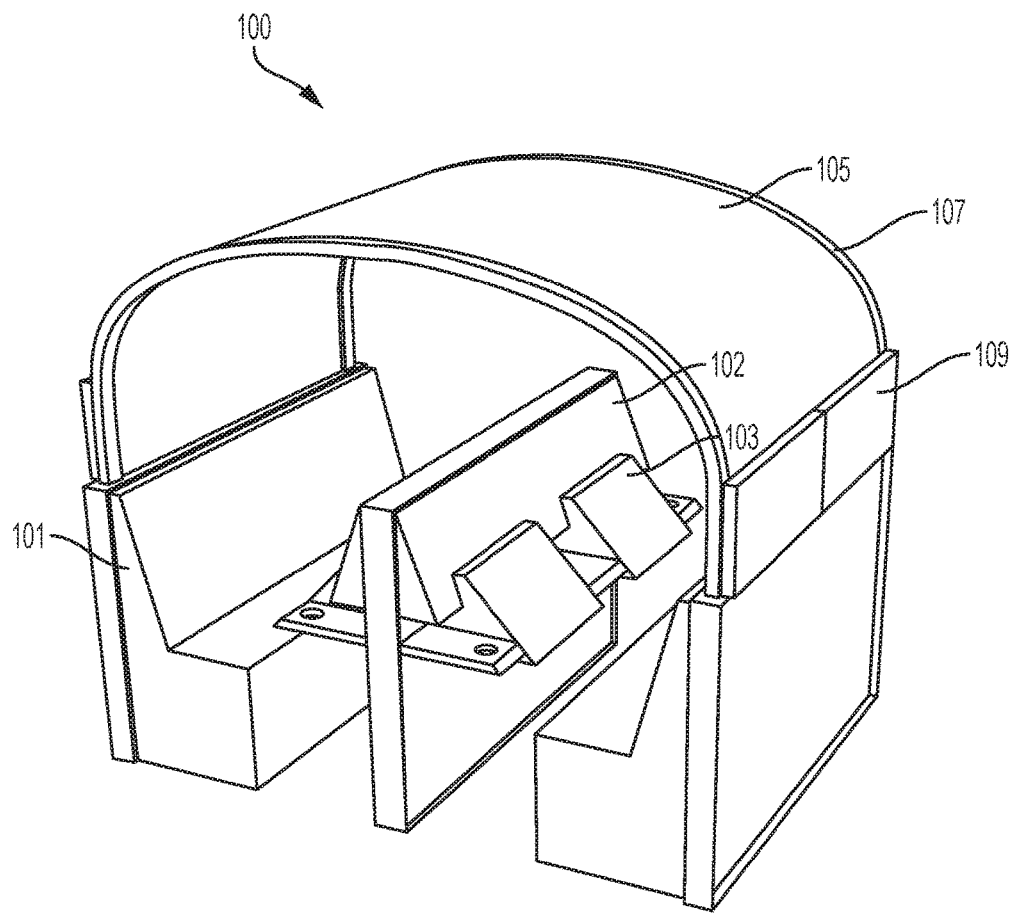
FIG. 10 is a perspective view of a gaming station that can be used as part of the guest engagement system.

Further examples of interface devices 17 that can be used as part of the guest engagement system 10 are gaming stations 100 such as that shown in FIG. 10. The gaming stations 100 provide environments in which guests can engage in gaming, including wager-based gaming, cooperative gaming with other guests, and head-to-head gaming against other guests.

Each gaming station 100 generally includes ergonomic seating 101 for multiple guests (e.g., four guests in the examples shown in FIG. 10), although a gaming station 100 for a single guest or modular gaming stations 100 for variable numbers of guests can also be used. The seating 101 can position guests across from each other with a central frame positioned between the guests and supporting components of the gaming station. Some guests can also be seated next to each other, as shown in FIG. 10. The gaming station 100 also includes one or more display screens 102 mounted to the central frame and used to display game play screens and images to users, and input devices 103 such as keyboards, touch pads, touch-sensitive displays, or the like, that are mounted to the central frame and used to receive input from users. The input devices 103 can also include microphones (e.g., a microphone array including multiple microphones disposed at different locations in the gaming station 100), optical sensors, and/or ultrasonic proximity sensors used to provide enhanced user input, user position data, and/or user movement data of users within the gaming station.

The gaming station 100 also includes one or more sensors 15 (not shown) that are mounted within the station 100 (e.g., at hidden or discrete locations) and are used to identify guests currently seated in the station 100 or otherwise using the station 100. The sensors 15 are used to detect medallions 11 of users of the station 100 in order to allow the users to log into the gaming station 100 and engage in gaming. The sensors 15 can also be used to establish secure communication connections to medallions 11 of users of the station 100 to authenticate the medallions 11 and engage in payment transactions. In general, the sensors 15 have sensing beams directed to the seating 101 of the gaming station 100 so as to detect the medallions 11 of guests that are seated in the gaming station 100. In some examples, the sensing beams of the sensors 15 are adjusted such that only medallions 11 that are within the gaming station 100 can be detected by the sensors 15. In an example, the sensors 15 are positioned and adjusted to detect medallions 11 in each seating location separately such that the gaming station can distinguish between guests located in each different seating location. A seating location may be defined as an area two feet wide, zero to 5 feet from the floor, and from one foot behind the edge of the table (to cover a purse/bag at the users feet) to three feet from the edge of the table. The medallions 11 may be detected when in an accessory, pocket (front or back), or bag located within a seating location.

In some embodiments, the gaming station 100 also includes a canopy 105 extending above the seating 101 of the gaming station 100. In the examples of FIG. 10, the canopy 105 is supported by two braces 107 and is formed of a semi-transparent material or a mesh material. The braces 107 support the canopy 105 and have integrated therein lighting (e.g., LED lighting) used to provide multi-colored lighting. The lighting may be controlled by a processor of the gaming station 100 to output lighting having an activation pattern and/or color pattern that is synchronized to a game being played on the gaming station 100. The braces 107 can further have integrated therein water misting spouts and/or scent/fragrance misting spouts. The misting spouts may be connected to a water supply valve or a reservoir (e.g., a scent reservoir) by piping extending through the braces 107 and into the seating 101 of the gaming station 100. The misting spouts connected to the water supply valve may be selectively controlled by a processor of the gaming station 100 to output water mist having an activation pattern that is synchronized to a game being played on the gaming station 100. The misting spouts connected to one or more scent reservoirs may be selectively controlled by the processor of the gaming station 100 to output scents (or mixtures of scents) having activation patterns and/or odors that are synchronized to the game being played on the gaming station 100. Separate misting spouts and piping may be provided in the braces 107 to separately and independently provide misting and scents. Additionally, different misting spouts and piping may be provided to emit different scents in the gaming station 100.

The gaming station 100 typically includes additional sensory feedback modalities for users in addition to visual feedback provided through the display screens and lighting. For example, the gaming station 100 typically includes speakers for auditory feedback (e.g., speakers mounted to the central frame, to the seating 101, and to the braces 107), as well as haptic or touch feedback provided by actuators mounted to the user input devices 103 and the seating 101 among other locations.

The gaming station 100 can also include one or more external facing display screens 109 on which game play screens and images can be displayed in real time to allow other guests to watch a game in progress. In some examples, the external facing display screen 109 is touch-enabled and allows spectating guests to participate in game play and/or place wagers on game play and player outcomes. In such examples, the gaming station 100 can include one or more external-facing sensors 15 disposed so as to sense medallions 11 of guests located in front of the external facing display screen 109. The external-facing sensors 15 can be used to detect medallions 11 of the guests and allow those guests to log into the gaming station 100 via the external facing display screen 109 to allow the guests to participate in or place wagers on gameplay. The external facing display screens 109 can also be used by guests to register for or join a queue for game play, such that the guests can be invited to join game play in registration or queue order as seating locations open up in the gaming station 100.

Operation of the gaming station 100 may be controlled by a computing platform provided within the seating 101. The computing platform will typically include one or more processors (e.g., three or more processors in some embodiments), memory storing program instructions for game play, a power source (e.g., including an uninterruptible power source (UPS)), and connections to each of the displays and input devices 102, 103, and 109. The computing platform will also be connected via the communication network 19 to the servers 21 of the guest engagement system 10. The computing platform is further connected to actuators controlling the misting spouts, as well as to controllers controlling the lighting, sound, and haptic or touch feedback. The various feedback modalities may be individually controlled for each player seating position, such that different players can be provided with different sensory feedback (including misting, scent, sound, haptic, touch, light, and display) at any time under control of the computing platform.

FIGS. 11 and 12 provide functional block diagram illustrations of general purpose computer hardware platforms. FIG. 11 illustrates a network or host computer platform, as may typically be used to implement a server such as any of the servers 21 described herein. FIG. 12 depicts a computer with user interface elements, as may be used to implement a portal (e.g., 17d) or other type of work station or terminal device of the guest engagement system 10, although the computer of FIG. 12 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A door latch assembly comprising:
   a door knob;
   a latch selectively operated by operation of the door knob;
   an electrical isolation sleeve mounted on a spindle of the door latch assembly and configured to electrically isolate the door knob from other portions of the door latch assembly;
   an electronically controlled locking mechanism operative to selectively unlock the latch;
   a proximity sensor operative to sense contact or proximity of a user with the door knob; and
   an access panel separate from the door knob and the latch, and including a radio configured for wireless communication with the electronically controlled locking mechanism, a first transceiver configured for wireless communication with a portable user device, and a second transceiver for communication with a reservation server,
   wherein the electronically controlled locking mechanism is operative to selectively unlock the latch based on the contact or proximity of the user with the door knob sensed by the proximity sensor,
   the door knob is electrically isolated from a ground potential,
   the proximity sensor is a capacitive touch sensor electrically connected to the electrically isolated door knob and operative to sense contact or proximity of the user with the electrically isolated door knob, and
   the access panel is configured to receive door access information from the reservation server via the second transceiver, determine whether the latch should be unlocked based on the door access information received from the reservation server, and transmit an instruction to unlock the latch to the electronically controlled locking mechanism via the radio based on the determination.

2. The door latch assembly of claim 1, wherein the electronically controlled locking mechanism is operative to activate a solenoid to unlock the door latch assembly only when the proximity sensor senses contact or proximity of the user with the door knob.

3. The door latch assembly of claim 1, wherein the access panel communicates via the first transceiver using a Bluetooth low energy (BLE) communication standard with the portable user device, and communicates via the second transceiver and a wired network connection with the reservation server.

4. The door latch assembly of claim 1, wherein the access panel is configured to receive a unique identifier from the portable user device through wireless communication with the portable user device via the first transceiver, determine whether the received unique identifier corresponds to an authorized user based on information on authorized users received from the reservation server via the second transceiver, and selectively transmit a latch unlocking signal based on the result of the determination.

5. The door latch assembly of claim 1, wherein the access panel further comprises:
a display configured to display information received from the reservation server and selected based on the unique identifier received from the portable user device; and
a camera configured to selectively capture an image of a user based on the result of the determination.

6. The door latch assembly of claim 5, wherein the access panel further comprises:
a communication antenna communicatively coupled to the first transceiver and disposed along an outer periphery of the display of the access panel.

7. The door latch assembly of claim 1, further comprising:
a door lock communication module electrically connected to the electronically controlled locking mechanism of the door latch assembly, and including a radio configured for wireless communication.

8. The door latch assembly of claim 7, wherein the door knob functions as a communication antenna for the radio of the door lock communication module.

9. The door latch assembly of claim 7, wherein the access panel communicates with the door lock communication module via short-range radio operating on the ISM band.

10. The door latch assembly of claim 7, wherein the access panel is configured to engage in encrypted wireless communications with the door lock communication module via the radio, and
the access panel is configured to engage in encrypted wireless communications with the portable user device via the first transceiver.

11. The door latch assembly of claim 7, wherein the electronically controlled locking mechanism is operative to unlock the latch in response to the door lock communication module receiving an unlocking signal via the radio.

12. The door latch assembly of claim 11, wherein in response to the door lock communication module receiving the unlocking signal, the electronically controlled locking mechanism is operative to unlock the latch only when the proximity sensor senses contact or proximity of the user with the door knob.

13. An electronic door lock assembly comprising:
a latch assembly including a latch and an electronically controlled locking mechanism operative to selectively unlock a door;
a door lock communication module electrically connected to the electronically controlled locking mechanism of the latch assembly, and including a radio configured for wireless communication; and
an access panel separate from and fixedly mounted proximate to the door lock communication module and latch assembly, and including a radio configured for wireless communication with the door lock communication module, a first transceiver configured for wireless communication with a portable user device, and a second transceiver for communication with a reservation server,
wherein the access panel separate from and fixedly mounted proximate to the door lock communication module is configured to receive door access information from the reservation server via the second transceiver, determine whether the door should be unlocked based on the door access information received from the reservation server, and transmit an instruction to unlock the door to the door lock communication module via the radio based on the determination.

14. The electronic door lock assembly of claim 13, wherein the radio, first transceiver, and second transceiver of the access panel each operate according to a different communication standard.

15. The electronic door lock assembly of claim 13, wherein the access panel communicates via the first transceiver using a Bluetooth low energy (BLE) communication standard with the user device, and communicates via the second transceiver and a wired network connection with the reservation server.

16. The electronic door lock assembly of claim 13, wherein the door lock communication module and the access panel communicate with via short-range radio operating on the ISM band.

17. The electronic door lock assembly of claim 13, wherein the door lock communication module is configured to engage in encrypted wireless communications with the access panel via the radio of the door lock communication module, and
the access panel is configured to engage in encrypted wireless communications with the door lock communication nodule via the radio of the access panel, and to engage in encrypted wireless communications with the user device via the first transceiver of the access panel.

18. The electronic door lock assembly of claim 13, wherein the access panel is configured to receive a unique identifier from the user device through wireless communication with the user device via the first transceiver, determine whether the received unique identifier corresponds to an authorized user based on information on authorized users received from the reservation server via the second transceiver, and selectively transmit a door unlocking signal to the door lock communication module based on the result of the determination.

19. The electronic door lock assembly of claim 18, wherein the access panel further comprises a display configured to display information received from the reservation server and selected based on the unique identifier received from the user device, and a camera configured to selectively capture an image of a user based on the result of the determination.

20. The electronic door lock assembly of claim 13, wherein the latch assembly further comprises a door knob and a proximity sensor operative to sense contact or proximity of a user with the door knob, and
the electronically controlled locking mechanism is operative to selectively unlock the door based on the contact or proximity of the user with the door knob sensed by the proximity sensor.

21. The electronic door lock assembly of claim 20, wherein the door knob is electrically isolated, and the proximity sensor is a capacitive touch sensor electrically connected to the electrically isolated door knob and operative to sense contact or proximity of the user with the electrically isolated door knob.

22. The electronic door lock assembly of claim 20, wherein the door knob is electrically isolated from ground, and the door knob functions as a communication antenna for the radio of the door lock communication module.

* * * * *